(12) United States Patent
Lawless

(10) Patent No.: US 7,455,165 B2
(45) Date of Patent: Nov. 25, 2008

(54) FREEWHEEL FLOW TRACK SYSTEMS

(75) Inventor: Robert J. Lawless, Acworth, GA (US)

(73) Assignee: Jolex Enterprises, Inc., Kennesaw, GA (US)

( * ) Notice: Subject to any disclaimer, the term of this patent is extended or adjusted under 35 U.S.C. 154(b) by 369 days.

(21) Appl. No.: 10/857,184

(22) Filed: May 28, 2004

(65) Prior Publication Data

US 2005/0077151 A1    Apr. 14, 2005

Related U.S. Application Data

(63) Continuation of application No. 09/956,253, filed on Sep. 20, 2001, now abandoned.

(60) Provisional application No. 60/234,568, filed on Sep. 22, 2000.

(51) Int. Cl.
B65G 13/00 (2006.01)

(52) U.S. Cl. .................. 193/37; 193/35 R; 301/64.707

(58) Field of Classification Search .................. 193/37, 193/35 R; 152/323–328; 301/5.301, 64.704, 301/64.707, 5.309; 492/57, 59
See application file for complete search history.

(56) References Cited

U.S. PATENT DOCUMENTS

| 2,609,917 | A | * | 9/1952 | Gotthardt | 198/789 |
| 2,686,549 | A | * | 8/1954 | Raymond | 301/67.707 |
| 3,283,358 | A | | 11/1966 | Merriam | |
| 3,900,112 | A | * | 8/1975 | Azzi et al. | 193/35 R |
| 4,162,032 | A | | 7/1979 | Lockwood | |
| 4,186,830 | A | * | 2/1980 | Corey et al. | 193/35 R |
| 4,239,100 | A | * | 12/1980 | Corey | 193/35 R |
| 4,339,158 | A | * | 7/1982 | Greener et al. | 193/37 |
| 4,448,296 | A | * | 5/1984 | Tabler | 193/35 C |
| 4,523,674 | A | * | 6/1985 | Haugen et al. | 198/843 |
| 4,832,098 | A | * | 5/1989 | Palinkas et al. | 152/7 |
| 4,921,029 | A | * | 5/1990 | Palinkas et al. | 152/11 |
| 5,024,312 | A | * | 6/1991 | Godbersen | 193/37 |
| 5,050,718 | A | * | 9/1991 | Orlosky | 193/35 R |
| 5,139,066 | A | * | 8/1992 | Jarman | 152/7 |
| 5,460,213 | A | * | 10/1995 | Pajtas | 152/1 |
| 5,951,228 | A | * | 9/1999 | Pfeiffer et al. | 414/276 |
| 6,354,677 | B1 | * | 3/2002 | Cook et al. | 305/122 |
| 6,793,060 | B2 | * | 9/2004 | Veitch | 193/35 R |
| 6,910,571 | B1 | * | 6/2005 | Ertel | 198/780 |
| 2003/0178886 | A1 | * | 9/2003 | Gorza et al. | 301/5.309 |

FOREIGN PATENT DOCUMENTS

| CA | 2029759 | 5/1992 |
| JP | 358128046 | 1/1982 |
| JP | 358062864 | 4/1983 |

* cited by examiner

Primary Examiner—James R Bidwell
(74) Attorney, Agent, or Firm—Sutherland Asbill & Brennan LLP

(57) ABSTRACT

Freewheel flow track systems are adapted for transporting pallets and/or cartons in heavy-duty pallet and carton flow applications. A flow track system may include multiple track sub-assemblies, each track sub-assembly including multiple wheel assemblies. Each wheel assembly comprises a wheel rotatably mounted on an axle. A lubricant coating may be fixed to and bonded with the axle. The wheel may be constructed from a polycarbonate-based resin that is impregnated with a lubricant for providing lifetime lubrication to the wheels. The wheel includes a hub, a rim concentric with the hub, a web connecting the hub to the rim, and ribs connecting the hub to the rim through the web.

44 Claims, 23 Drawing Sheets

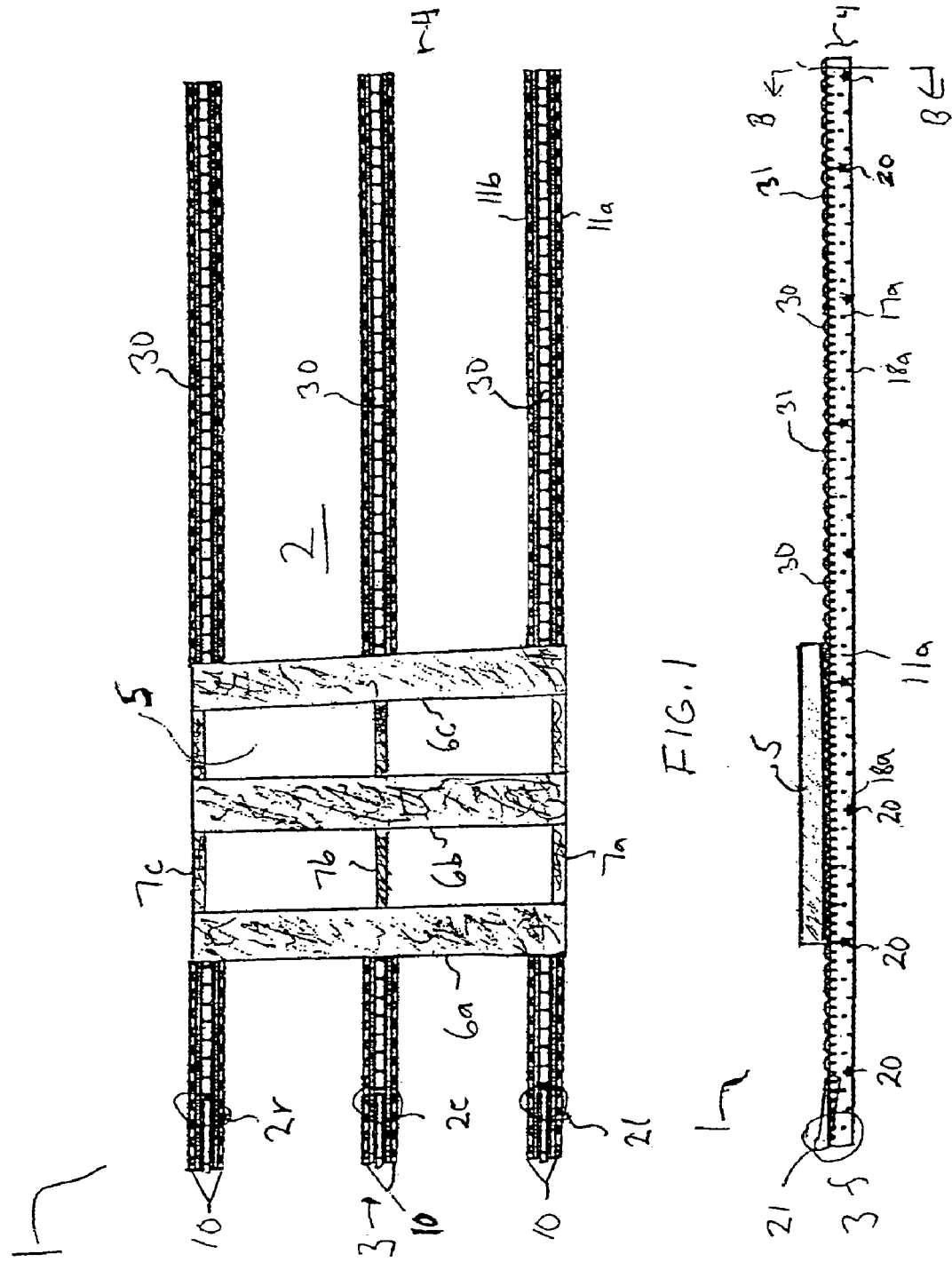

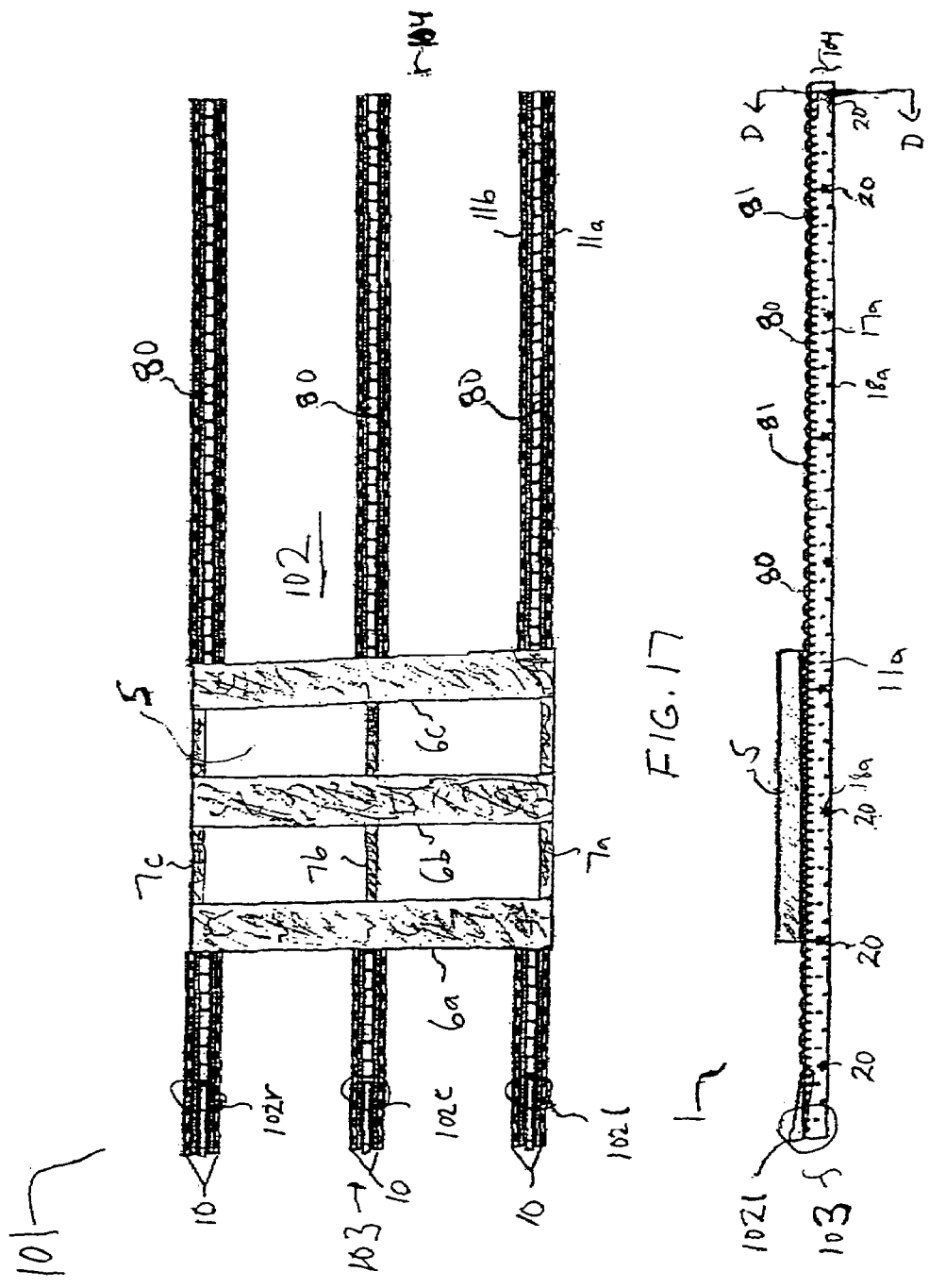

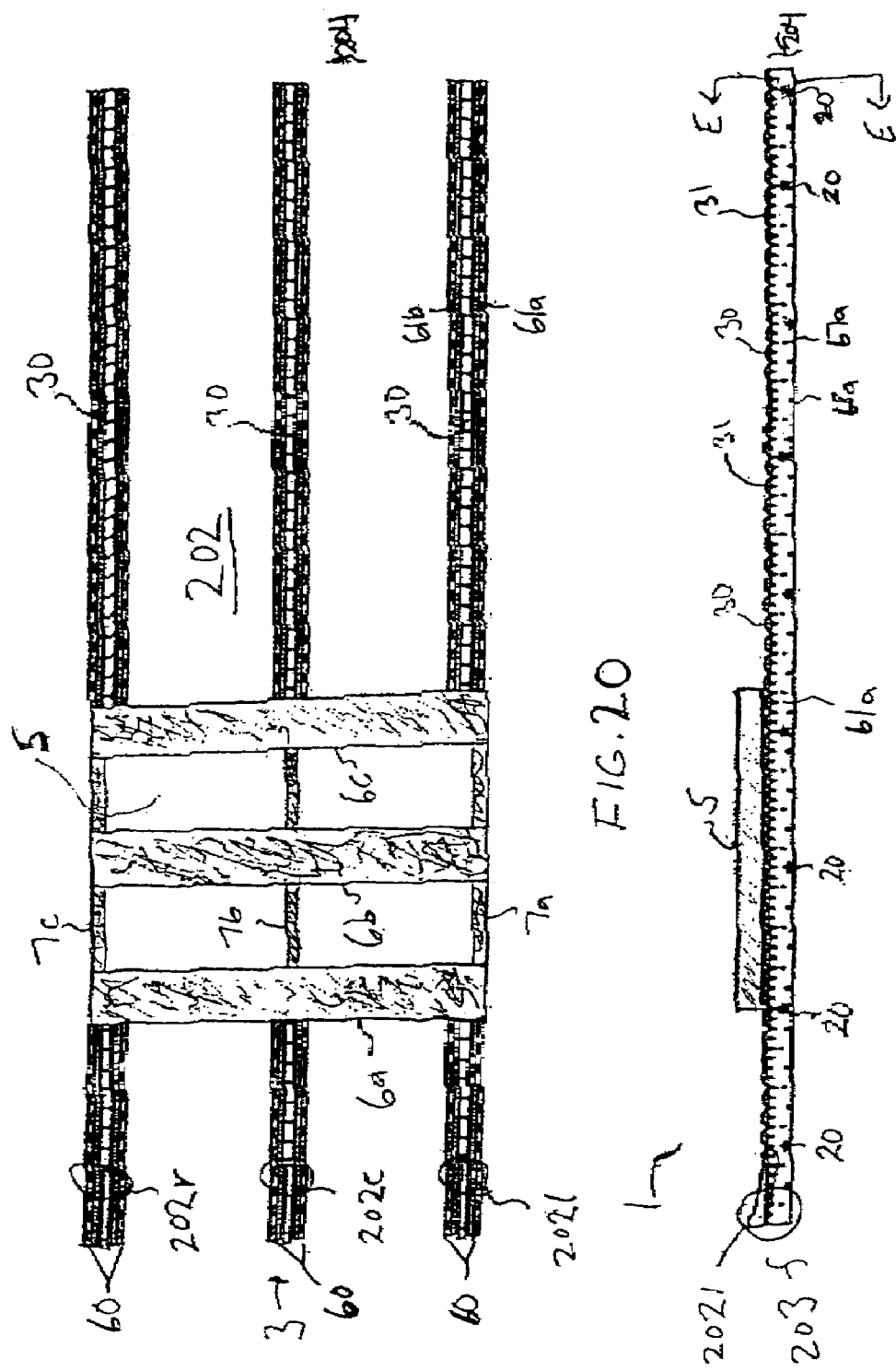

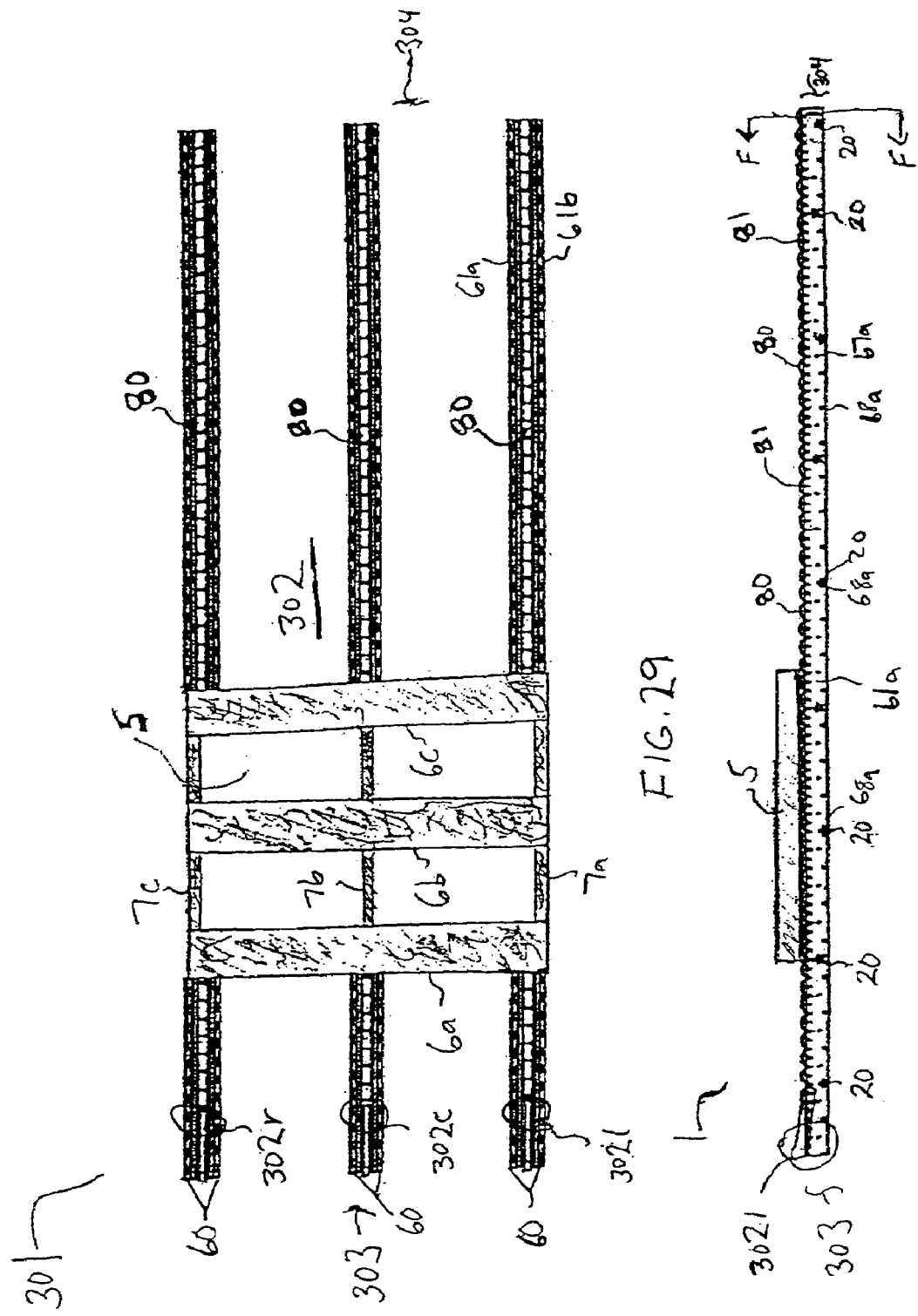

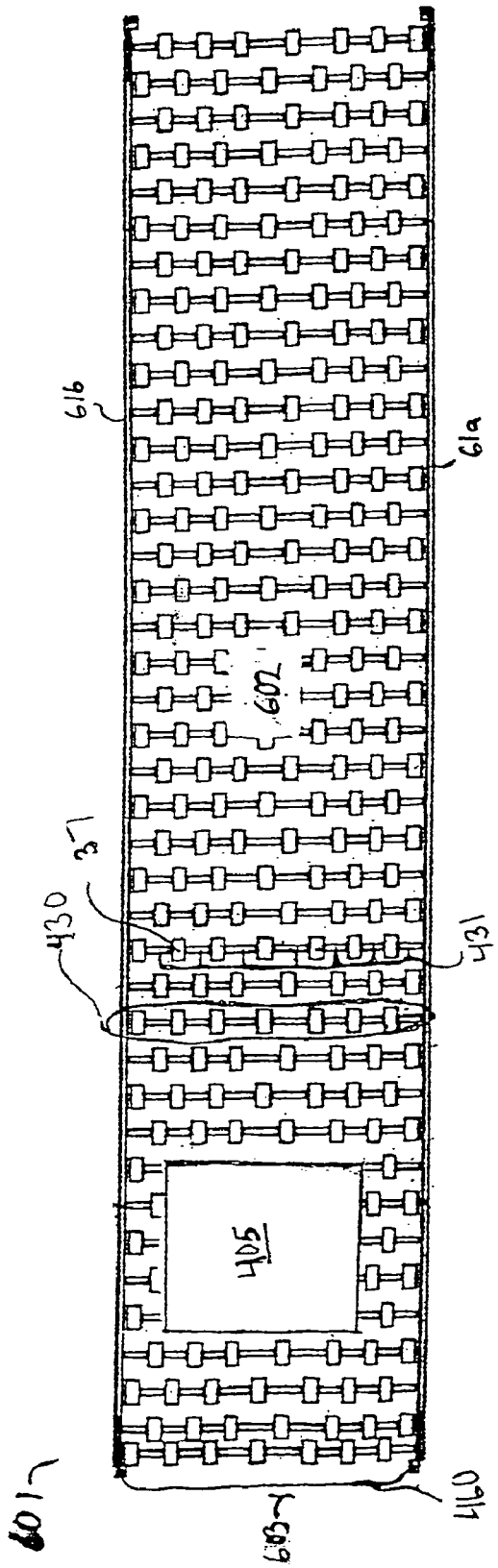
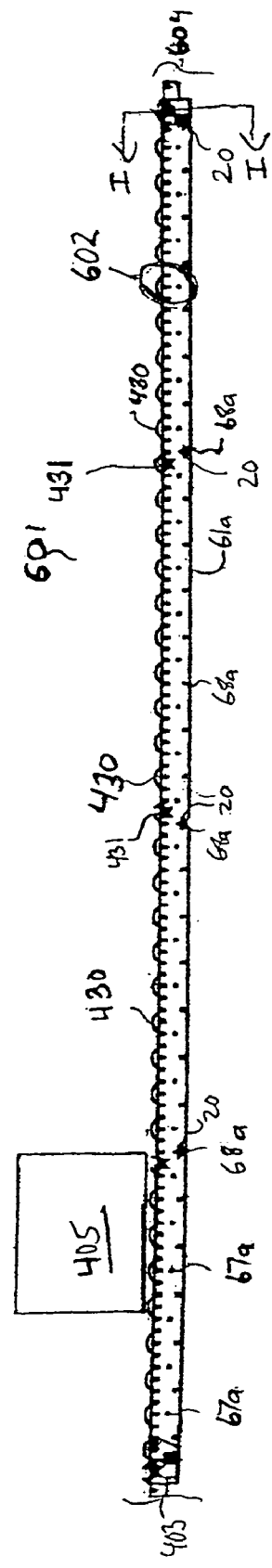
FIG. 38
FIG. 39

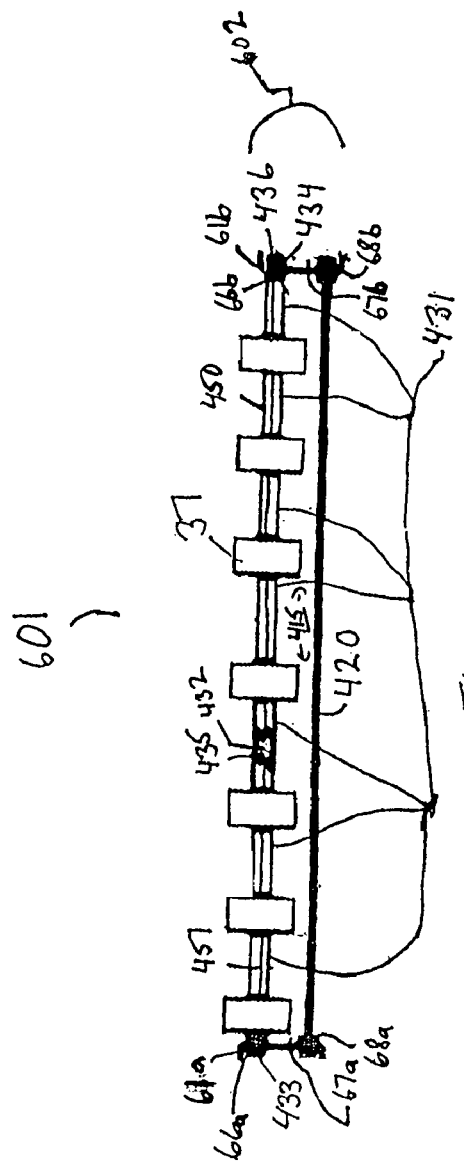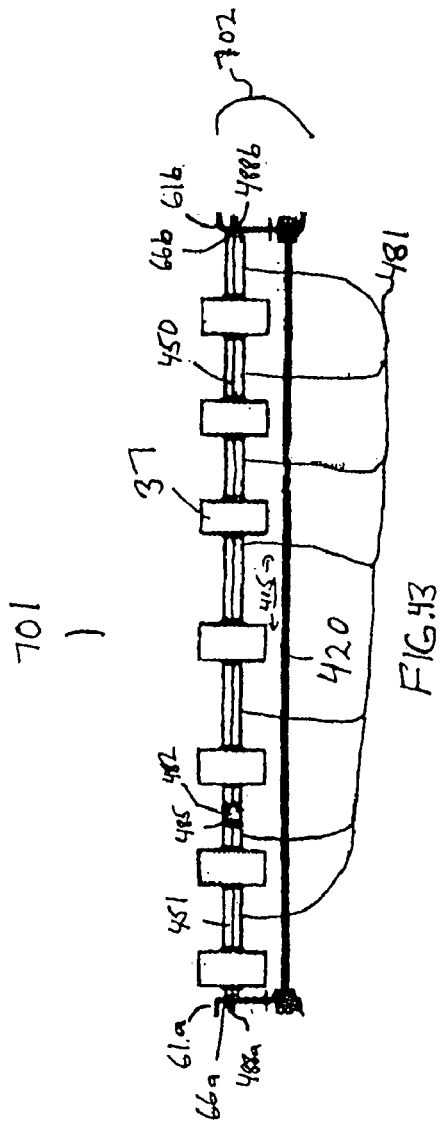

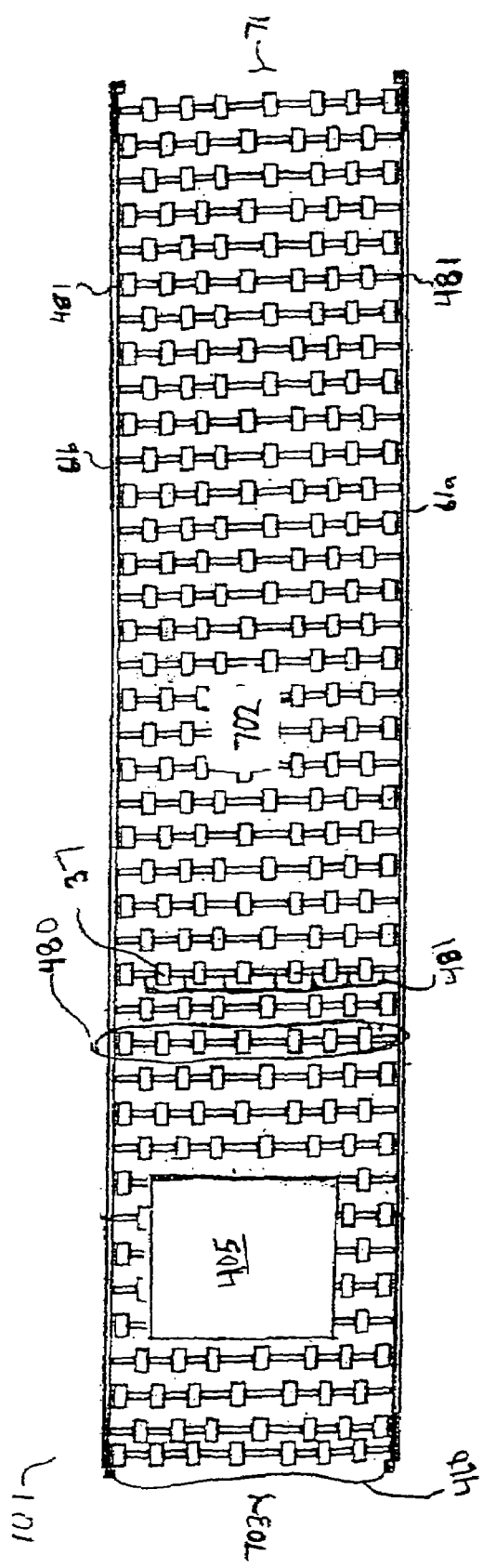
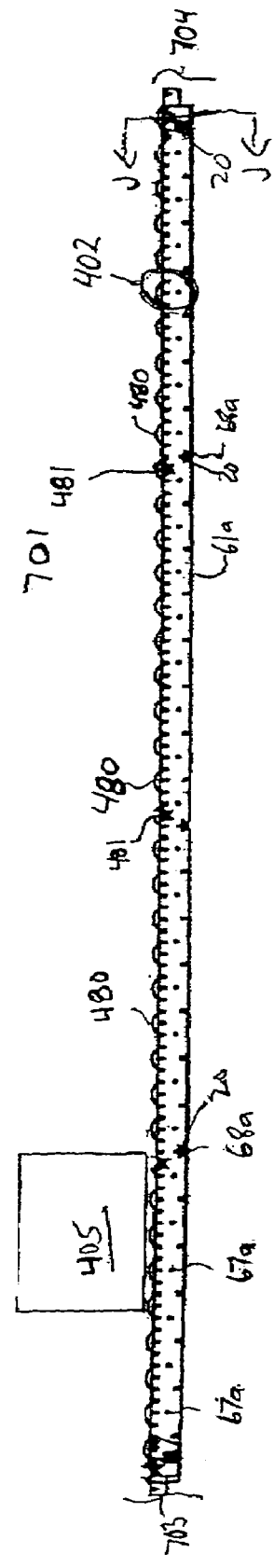
FIG. 41
FIG. 42

FREEWHEEL FLOW TRACK SYSTEMS

This application is a continuation of application Ser. No. 09/956,253, filed on Sep. 20, 2001 now abandoned, which application claims benefit of Ser. No. 60/234,568, filed Sep. 22, 2000.

BACKGROUND OF THE INVENTION

The steel wheel track system, or skate wheel track system, is one of the most commonly used flow track systems in the material handling industry. The steel wheel track system comprises a track assembly including one or more parallel track frames. Each track frame includes a pair of parallel steel frame members, also known as "profiles", and multiple wheel assemblies mounted between the profiles. Each wheel assembly includes a steel wheel rotatably mounted on an axle that extends between the profiles transverse to the track flow direction. The wheels are typically 1.9 inches in diameter and 0.50 inches to 0.56 inches in width. The wheels comprise steel outer shells having thicknesses between 22 gage and 13 gage, depending upon the particular application in which the wheels are used. Additionally, a number of ball bearings are used in the wheels to increase the load capacity of the wheels and to enable the wheels to roll. Each wheel will typically have between six and twelve ball bearings. The load capacity of a skate wheel can vary between twenty-five pounds to one hundred-fifty pounds, depending on the thickness of the shell and the number of bearings the wheel contains.

Steel wheel track systems are predominantly used in picking applications. Picking applications are applications in which a loaded wooden pallet is placed on the track assembly at an entrance end of the track assembly, rolled forward to an exit end of the track assembly and then presented to a picker that takes cartons off the pallet for order picking and shipping to stores or other locations. Steel wheel track systems are also used in applications in which cartons are placed directly on the track assembly and rolled from an entrance end of the track assembly to an exit end of the track assembly.

There are several problems that occur with existing steel wheel track systems. One problem occurs because the pallets used in picking operations are sometimes low quality pallets that have broken bottom boards and/or soft, damaged wood. Due to the narrowness of the steel wheels presently used (only 0.50 inches to 0.56 inches wide), the wheels tend to get caught by broken boards or embed themselves in soft wood. Likewise, when damaged cartons are transported directly on a track assembly, the wheels tend to embed themselves in damaged sections of the cartons. In such situations, a picking operator must pull the pallet or carton towards the exit end of the track assembly using a tool called a shepherd's hook. In doing so, the operator must often exert high forces to keep the pallet moving towards the exit end of the track assembly. As a result, operators have slipped, fallen and sustained injuries while using shepherd's tools to move pallets.

Another problem occurs when low quality pallets are used. When a skate wheel track is designed, consideration is given to the loads that the skate wheels must support. The load that each wheel supports is a factor of the load being carried by the pallets, the length of the pallets used and the number of wheels on the track assembly for a given length (thus, the number of wheels supporting the pallet). Based on the load, the length of the pallets and the number of wheels for a given length, the required load capacity for each wheel can be calculated. A particular wheel design (i.e., outer shell thickness and number of bearings) can be selected. However, the wheels are subjected to unusually high loads when a pallet is used that is missing a front or a back board, or that is otherwise shorter than the pallets the tracking system is designed to carry. This is due to the fact that a fewer number of wheels support the shorter pallet. The wheels may not be capable of supporting the elevated loads and may break, requiring the picking operator to use a shepherd's tool to move the pallets forward along the track assembly. As stated before, this can result in injury to the picking operator.

Yet another problem exists with present steel wheel track systems. Many flow systems, such as those in environments that are subject to FDA cleanliness requirements, require washdowns. However, the steel wheels used in present flow track systems are susceptible to corrosion. Thus, frequent washdowns can damage steel wheels and cap eventually render them inoperable.

It is an object of the present invention to provide a flow track system that will allow pallets and cartons to flow reliably, efficiently, and in a way that is safe for picking operators. It is a further object of the invention to provide a flow track system that can be used in environments that require washdowns.

SUMMARY OF THE INVENTION

The present invention discloses Freewheel Flow Track Systems for transporting pallets and/or cartons in heavy-duty pallet and carton flow applications. According to certain embodiments of the invention, a flow track system comprising multiple, longitudinally extending, parallel track sub-assemblies is disclosed. Each track sub-assembly includes a track frame comprising a pair of parallel profiles, and multiple wheel assemblies connected to the pair of profiles and arranged in a row extending from an entrance end of the track assembly to an exit end of the track assembly. The wheel assemblies each comprise an axle extending between the pair of profiles and a polycarbonate resin wheel rotatably mounted on the axle.

A lubricant coating is fixed to and bonded with the axle. The polycarbonate resin wheels are constructed from a polycarbonate-based resin that is impregnated with a lubricant for providing lifetime lubrication to the wheels. The lubricant in the wheels and the lubricant coating of the axles give the wheel assemblies a low coefficient of friction, high rollability and high durability. The wheels each include a hub, a rim that is concentric with the hub, a web that connects the hub to the rim and ribs that connect the hub to the rim through the web. The wheel assemblies are self-lubricating and are of high strength for transporting heavy pallets and cartons.

According to other embodiments of the invention, a flow track system including a single track assembly suitable for directly supporting cartons is disclosed. The track assembly includes a wide track frame. The track frame includes a pair of parallel profiles and multiple wheel assemblies connected to the profiles and arranged in a row extending from an entrance end of the track assembly to an exit end of the track assembly. In this embodiment, each wheel assembly includes an axle extending between the profiles and a multiple wheels rotatably mounted on the axle in a row extending transverse to the track flow direction.

The freewheel flow track systems disclosed by the invention provide reliable, efficient and safe pallet and carton flow. The flow track assemblies disclosed by the present invention are more durable and require less maintenance than existing flow track systems. In particular, the wheel assemblies of the present invention are self-lubricating, and the polycarbonate wheels are stronger and wider than conventional track wheels to avoid overloading problems and flow problems typically caused by damaged or irregular pallets and cartons. Other features and advantages of the present invention will be apparent to those of skill in the art upon reading and understanding the following detailed description of the invention, drawings and claims.

BRIEF DESCRIPTION OF THE DRAWINGS

FIG. 1 shows a cut-away top view of a freewheel flow track system according to one embodiment of the invention.

FIG. 2 shows a cut-away side view of the freewheel flow track system of FIG. 1.

FIG. 17 shows a cut-away top view of a freewheel flow track system according to another embodiment of the invention.

FIG. 18 shows a cut-away side view of the freewheel flow track system of FIG. 17.

FIG. 20 shows a cut-away top view of a freewheel flow track system according to another embodiment of the invention.

FIG. 21 shows a cut-away side view of the freewheel flow track system of FIG. 20.

FIG. 29 shows a top view of a freewheel flow track system according to another embodiment of the invention.

FIG. 30 shows a side view of the freewheel flow track system of FIG. 29.

FIG. 38 shows a cut-away top view of a freewheel track system according to yet another embodiment of the invention.

FIG. 39 shows a cut-away side view of the freewheel track system of FIG. 38.

FIG. 40 shows a view of a track assembly of the freewheel system of FIG. 39 taken along section I-I.

FIG. 41 shows a cut-away top view of a freewheel track system according to yet another embodiment of the invention.

FIG. 42 shows a cut-away side view of the freewheel track system of FIG. 41.

FIG. 43 shows a view of a track assembly of the freewheel system of FIG. 42 taken along section J-J.

DETAILED DESCRIPTION OF THE INVENTION

Figure 3:
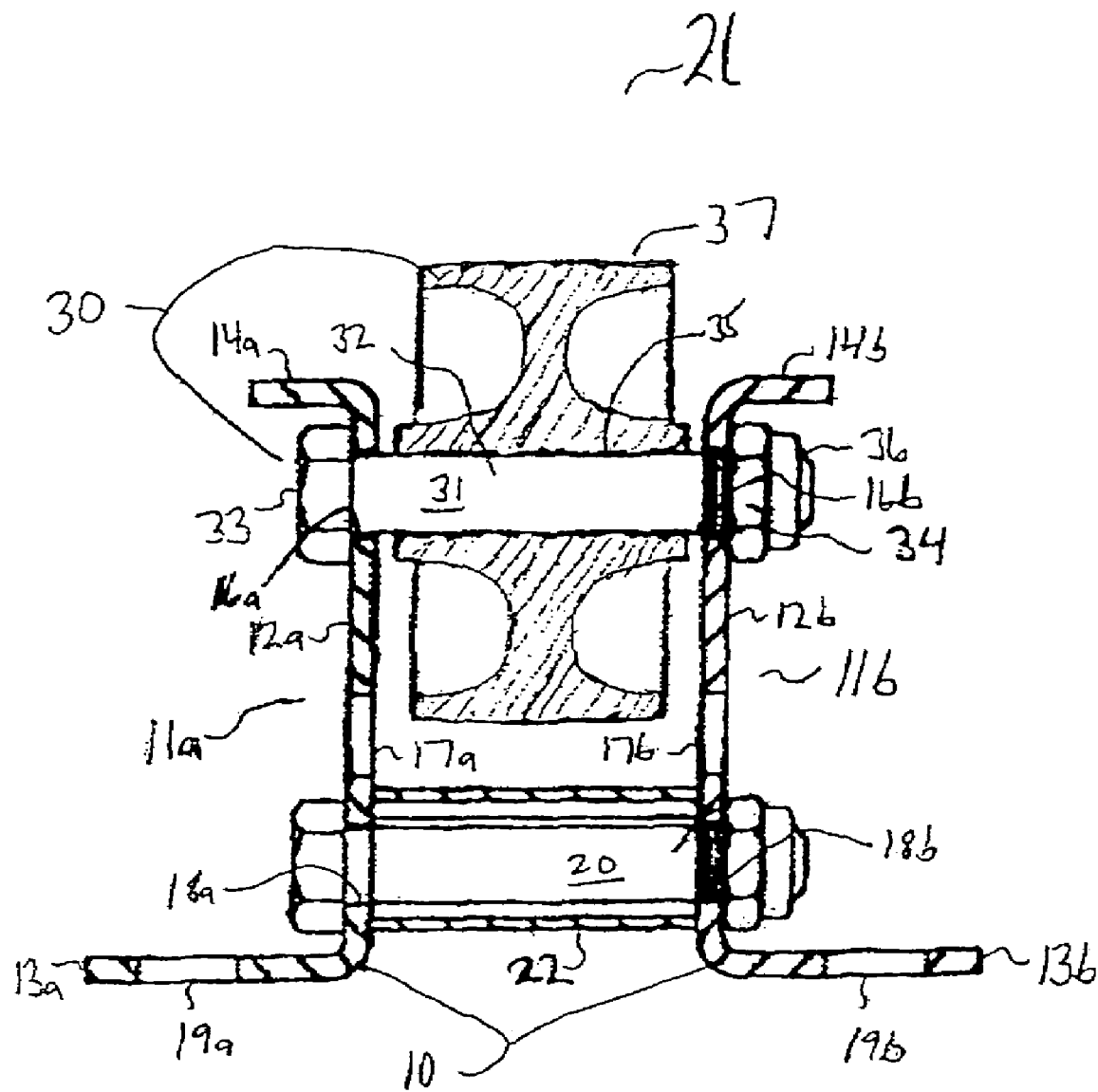
FIG. 3 shows a view of a track subassembly of FIG. 2 taken along section B-B.
Figure 4:
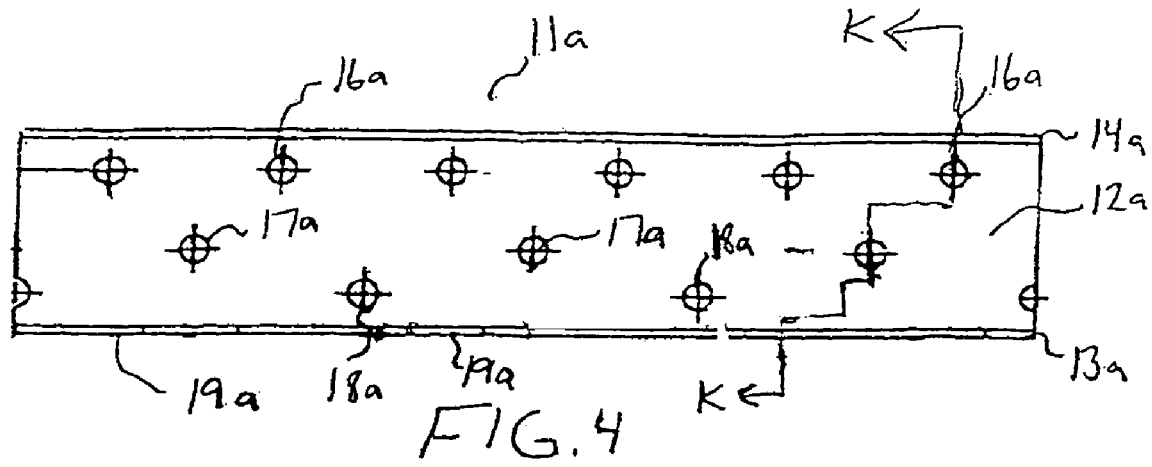
FIG. 4 shows a partial side view of a first profile of the freewheel flow track system of FIG. 1.
Figure 5:
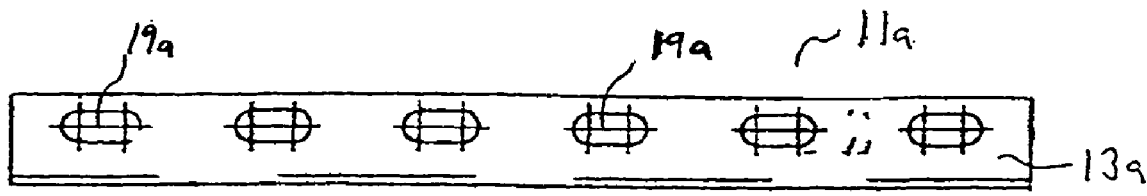
FIG. 5 shows a partial bottom view the profile of FIG. 4.

Referring to the drawings, in which like numerals represent like components throughout the several views, FIGS. 1 and 2 show cut-away representations of a Freewheel Flow Track System 1 according to a preferred embodiment of the invention. FIG. 1 shows a cutaway view of the freewheel flow track system 1 including a track assembly 2 having an entrance end 3 and an exit end 4. Products supported by the track assembly 2 are transported in a track flow direction extending from the entrance end 3 to the exit end 4. The track assembly 2 comprises three parallel track sub-assemblies 2*l*, 2*c* and 2*r* extending longitudinally from the entrance end 3 to the exit end 4, wherein the track sub-assemblies 2*l*, 2*c* and 2*r* are left, center and right sub assemblies, as viewed from exit end 4. It should be understood that, although the track system 1 is shown with three track sub-assemblies, it is possible for track systems to include fewer than three track sub-assemblies or more than three track sub-assemblies, as required by the loads transported by the system. For example, track sub-assembly 2*c* may be eliminated in certain applications, such that only two track sub-assemblies 2*l* and 2*r* are utilized. Continuing, the track sub-assemblies 2*l*, 2*c* and 2*r* are supported by an underlying support structure (not shown), typically (though not necessarily) in an inclined orientation. The track sub-assemblies 2*l*, 2*c* and 2*r* each include a track frame 10 and wheel assemblies 30 mounted to the respective track frame 10 for maintaining rolling engagement with a wooden pallet 5. The wheel assemblies of each track sub-assembly 2*l*, 2*c* and 2*r* are arranged in a row extending from the entrance end 3 to the exit end 4.

A wooden pallet 5 is shown supported by the track assembly 2. The pallet 5 is representative of one type of pallet commonly used in picking applications and includes three transversely extending top boards 6*a*, 6*b* and 6*c*, three longitudinally extending pallet stringers 7*a*, 7*b* and 7*c*, and three transversely extending bottom boards, which are hidden from view by the top boards 6*a*, 6*b* and 6*c*. The top boards 6*a*, 6*b* and 6*c* and bottom boards are connected to the pallet stringers 7*a*, 7*b* and 7*c*. The bottom boards of the pallet 5 contact the wheel assemblies 30. Of course, the invention is not limited by the type of pallet utilized.

The track sub-assemblies 2*l*, 2*c* and 2*r* are identical in construction. Therefore, only one track sub-assembly 2*l* will be described in further detail. It should be understood that track sub-assemblies 2c and 2r include the same elements shown and described with respect to track sub-assembly 2l.

Figure 6:
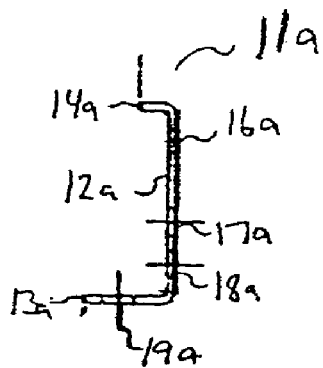
FIG. 6 shows a view of the profile of FIG. 4, taken along section K-K.
Figure 7:
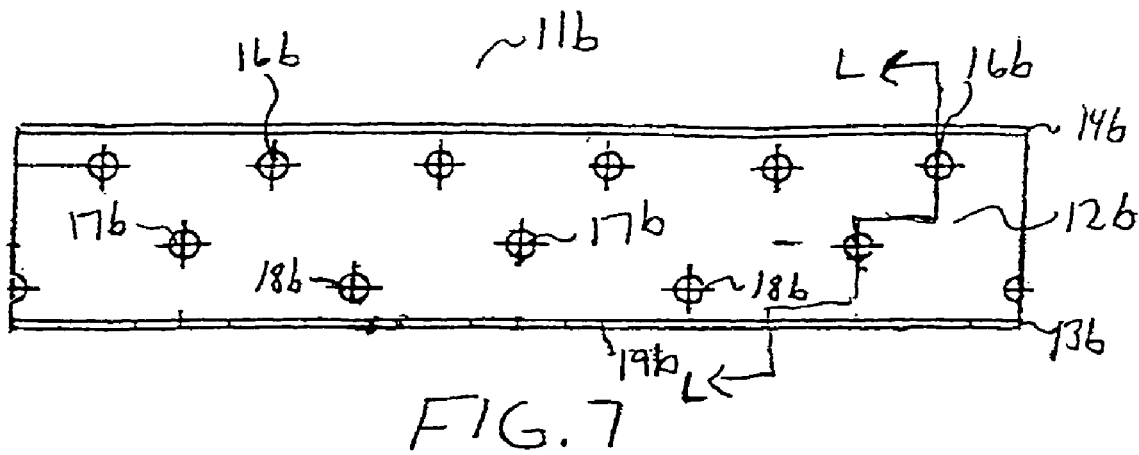
FIG. 7 shows a partial side view of a second profile of the freewheel flow track system of FIG. 1.
Figure 8:
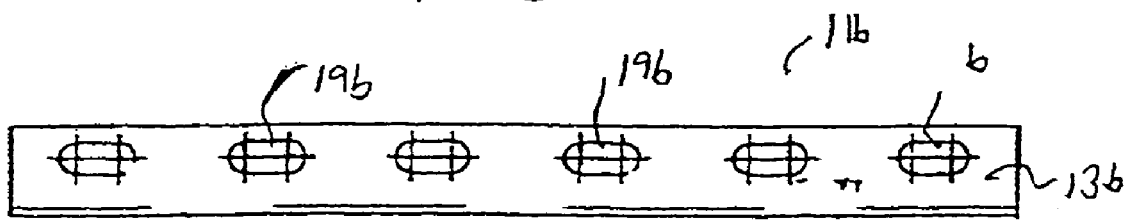
FIG. 8 shows a partial bottom view the profile of FIG. 7.
Figure 9:
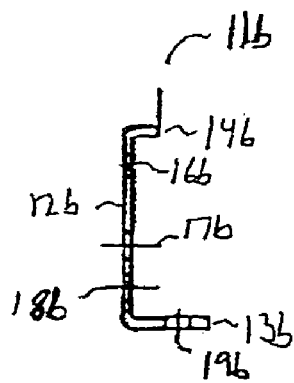
FIG. 9 shows a view of the profile of FIG. 7, taken along section L-L.

As shown in FIGS. 2 and 3, the track frame 10 of track sub assembly 2l includes a first, or left profile 11a and a second, or right profile 11b, which are fastened together in a spaced relationship by threaded fastening rods 20. Profiles 11a and 11b are supported by the support structure. As shown in FIGS. 3-9, profiles 11a and 11b are identical in construction. However, profiles 11a and 11b are installed in opposite orientations, as can be seen in FIG. 3. The profiles 11a and 11b are fastened together in spaced relationship, forming a channel 15 between them. Profiles 11a and 11b preferably comprise enhanced C-channel members constructed from galvanized steel, but may be constructed from other suitable parts and/or materials. As shown in FIGS. 3 and 6, the profile 11a includes a vertical section 12a, a bottom leg 13a connected to a bottom part of vertical section 12a and an upper leg 14a connected to a top part of vertical section 12a. Similarly, as shown in FIGS. 3 and 9, profile 11b includes a vertical section 12b, a bottom leg 13b connected to a bottom part of vertical section 12b and an upper leg 14b connected to a top part of vertical section 12b. The lower legs 13a and 13b and upper legs 14a and 14b extend away from the channel 15 in a direction substantially perpendicular to the length of the profiles 11a and 11b. The lower legs 13a and 13b extend wider in a direction perpendicular to the length of the profiles 11a and 11b than the upper legs 14a and 14b do, in order to provide a wide support base for the profiles 11a and 11b.

A longitudinal row of bottom leg mounting holes 19a and 19b (shown best in FIGS. 5 and 8) is provided in the lower legs 13a and 13b, respectively, for mounting each profile 11a and 11b to the support structure. The top legs 14a and 14b extend away from the channel 15 to cover mounting hardware for the wheel assemblies 30, which are described in following paragraphs. Referring now to FIGS. 4, 6, 7 and 9, each channel section 12a and 12b further includes a longitudinal row of upper profile mounting holes 17a and 17b, respectively, and a longitudinal row of lower profile mounting holes 18a and 18b, respectively. The lower profile mounting holes 18a and 18b are disposed below and longitudinally offset from the respective upper profile mounting holes 17a and 17b, such that upper profile mounting holes 17a and 17b and lower profile mounting holes 18a and 18b are disposed along the length of the respective profiles 11a and 11b in alternating fashion. As shown in FIG. 3, the profile mounting holes 17a and 18a of the profile 11a are aligned with profile mounting holes 17b and 18b of the profile 11b. As illustrated in FIGS. 2 and 3, the threaded rods 20 are fastened between selected corresponding pairs of upper profile mounting holes 17a and 17b and lower profile mounting holes 18a and 18b to secure the profiles 11a and 11b to each other. Spacers 22 are mounted on the rods 20 to stabilize the profiles 11a and 11b, and to maintain proper spacing between the profiles 11a and 11b. Preferably, the threaded fastening rods 20 are fastened between corresponding pairs of upper profile mounting holes 17a and 17b and corresponding pairs of lower profile mounting holes 18a and 18b in alternating fashion as indicated in FIG. 2.

The channel sections 12a and 12b further include axle mounting holes 16a and 16b as shown in FIGS. 3, 4, 6, 7 and 9. The axle mounting holes 16a and 16b are disposed in a longitudinal row along the channel sections 12a and 12b, respectively. The axle mounting holes 16a of profile 11a are aligned with the axle mounting holes 16b of profile 11b for receiving axles of wheel assemblies 30. The wheel assemblies 30 will now be described in greater detail.

A wheel assembly 30 is shown in FIG. 3. Each wheel assembly 30 includes an axle 31 and a polycarbonate resin wheel 37 rotatably mounted on the axle 31. As shown in FIG. 3, each axle 31 includes a shaft portion 32, a head portion 33 adjacent one end of the shaft portion 31 and a threaded end portion 34 adjacent a second end of the shaft. Axles 31 are preferably constructed from steel, but may be constructed from another suitable metal. Each axle 31 further comprises a lubricant coating 35 that is fixed to and bonded with the shaft portion 32. Preferably, the coating 35 is fluorocarbon-based or Teflon-based and is heated to a high temperature to fix to and bond with the shaft portion 32. Each axle 31 extends between profiles 11a and 11b transverse to the track flow direction. The head portion 33 and threaded end portion 34 of each axle 31 are mounted within an axle mounting holes 16a and 16b, respectively. A nut 36 engages the threaded end portion 34 of each axle 31 and works in conjunction with the head portion 33 to secure the axle 31 between axle holes 16a and 16b.

Figure 10:
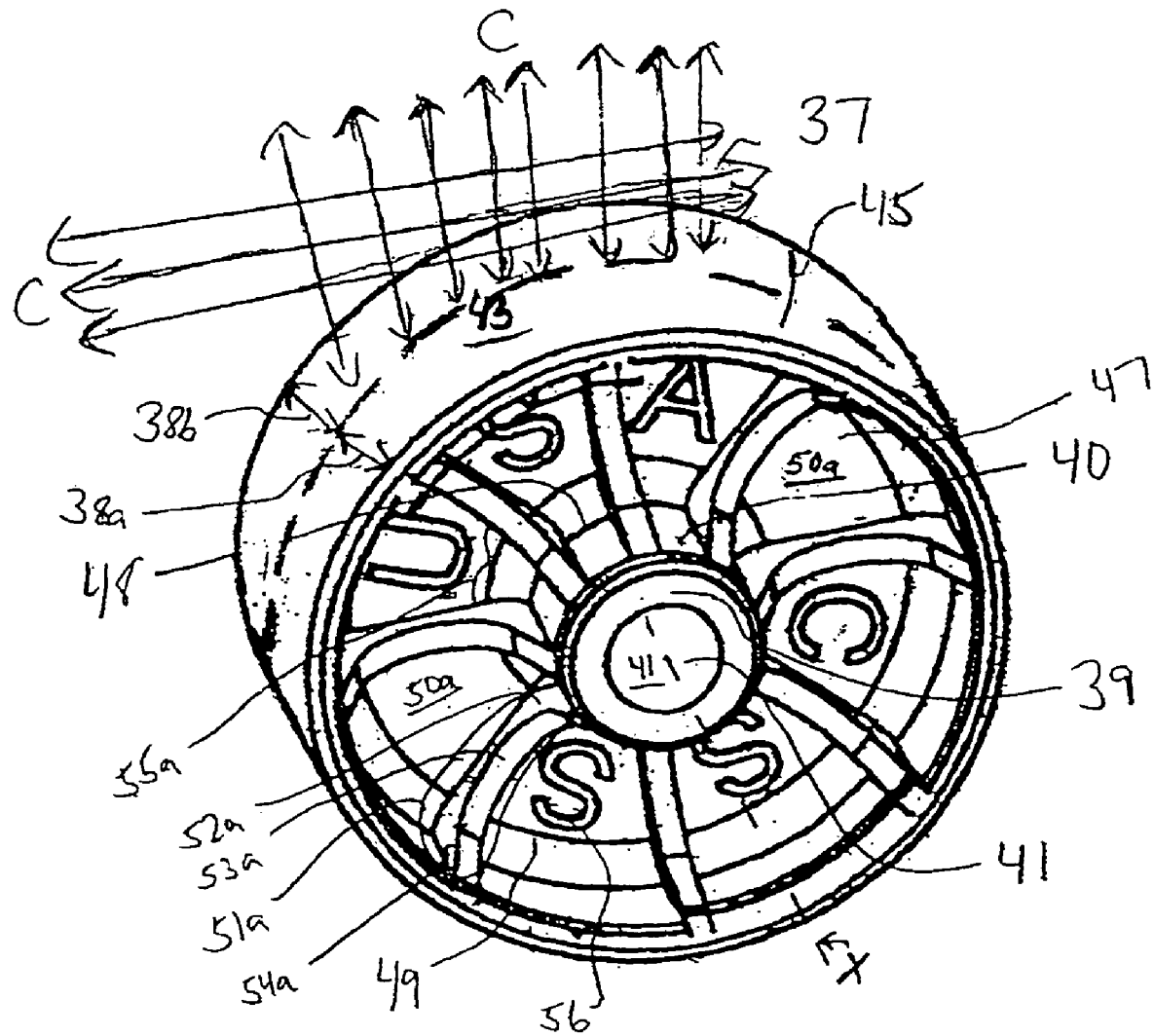
FIG. 10 shows a first view of a wheel for a freewheel flow track system.
Figure 11:
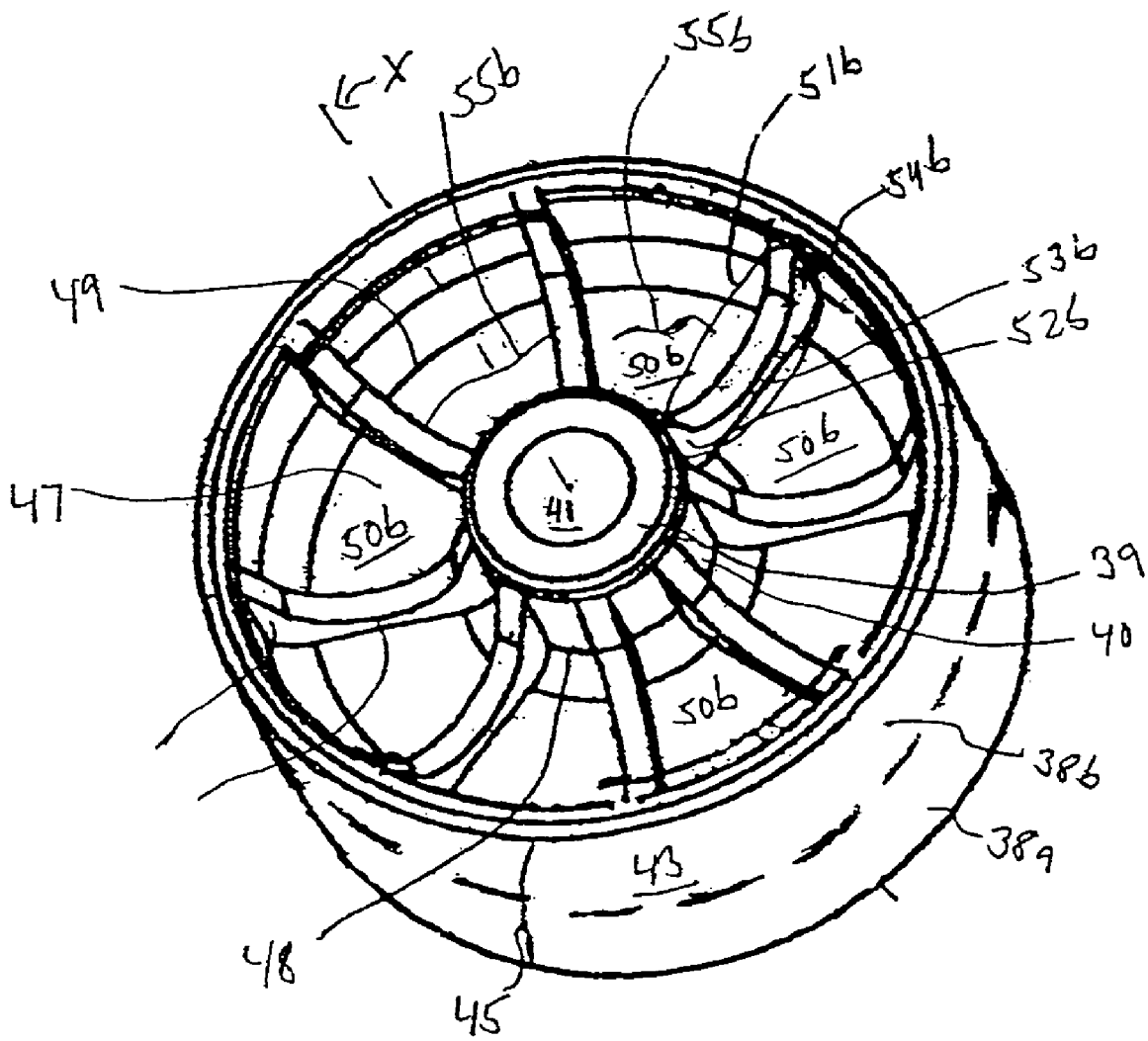
FIG. 11 shows a second view of the wheel of FIG. 10.

A preferred embodiment of a wheel 37 is shown in FIGS. 10-16. Referring to FIGS. 10-11, wheel 37 is formed as a unitary body and is constructed of a polycarbonate-based resin impregnated with a lubricant. That is, a polycarbonate-based resin is mixed with a lubricant to form the wheel 37. Preferably, the polycarbonate-based resin is impregnated with a lubricant comprising silicone and/or molybdenum. One example of an acceptable material is that known as PC/PET 325, manufactured/distributed by B&M Plastics, which has been impregnated with a lubricant comprising silicone and molybdenum. The wheel 37 includes a substantially cylindrical hub 39 coaxial with a rotational axis X of the wheel 37, a rim 43 concentric with the hub, and a web 47 connecting the hub 39 to the rim 43. The wheel 37 may further include multiple ribs 51a and 51b connecting the hub 39 to the rim 43 through the web 47. The ribs 51a and 51b are optionally provided to strengthen the wheel 37. The hub 39 includes an outer circumferential surface 40 connected to the web 47 at a hub-web junction 48 (shown in FIGS. 10, 11 and 14), and a passage 41 for receiving an axle 31 and allowing the wheel 37 to rotate about the axle 31. The rim 43 comprises an inner circumferential surface 44 connected to the web at a rim-web junction 49 (shown in FIGS. 10, 11, 13 and 14) and an outer circumferential surface, or tread surface 45 for contacting the pallet 5.

Figure 12:
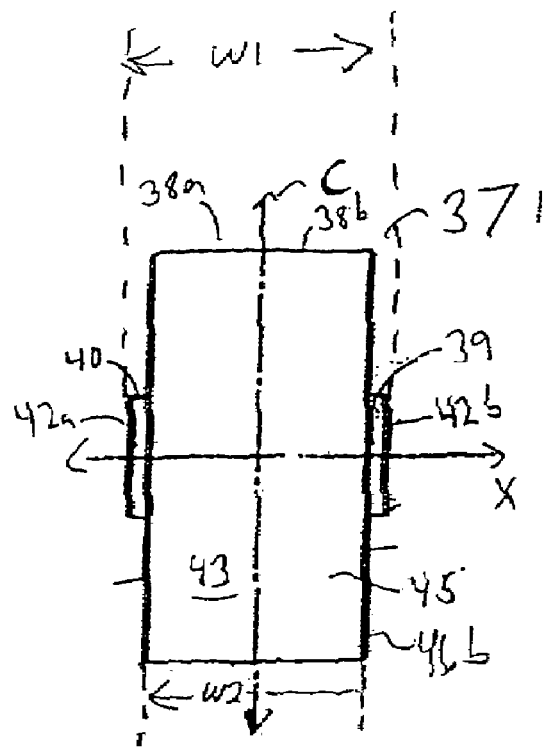
FIG. 12 shows an end view of the wheel of FIG. 10.
Figure 13:
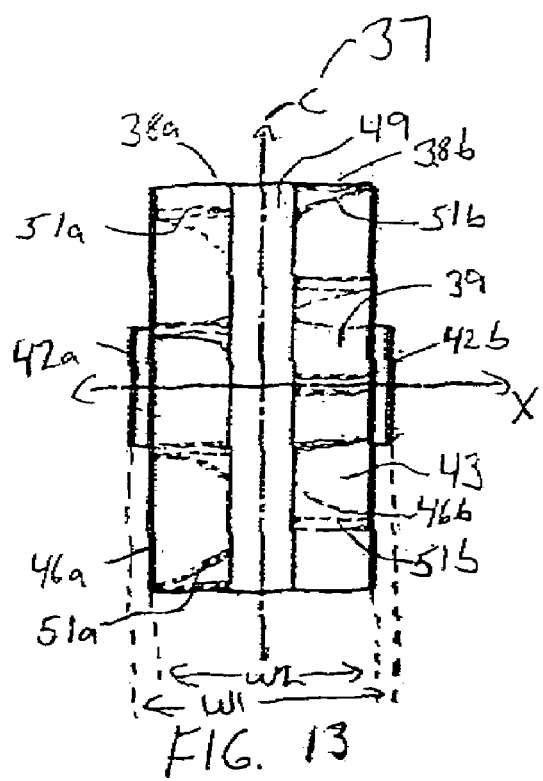
FIG. 13 shows a transparent end view of the wheel of FIG. 10.

Referring to FIGS. 12 and 13, the hub 39 has a hub width W1 measured along a line parallel to the rotational axis X. The rim 43 has a rim width W2 that is measured along a line parallel to the rotational axis X. The hub width W1 is slightly greater than the rim width W2. According to an exemplary embodiment of the invention, the hub width W1 is approximately 1.165 inches and the rim width W2 is approximately 1.125 inches. Thus, the hub 39 and rim 43 are wider than the hubs and rims of prior art skate wheels. Referring to FIGS. 12 and 13, the web 47 extends from the hub 39 to the rim 43 along a wheel center plane C that is perpendicular to the rotational axis X and that bisects the width W1 of the hub. The wheel center plane C bisects the wheel 37 into a first, or left wheel side 38a to the left of the center plane C and a second, or right wheel side 38b to the right of the center plane C. As shown in FIGS. 10-14, the hub 39 includes a first, or left end 42a and a second, or right end 42b on the left and right wheel sides 38a and 38b, respectively. The rim 43 includes a first, or left rim edge 46a and a second, or right rim edge 46b on the left and right sides 38a and 38b, respectively. Referring to FIGS. 10 and 11, the web 47 includes a first, or left web face 50a on the left side 38a and a second, or right web face 50b on the right side 38b.

Figure 15:
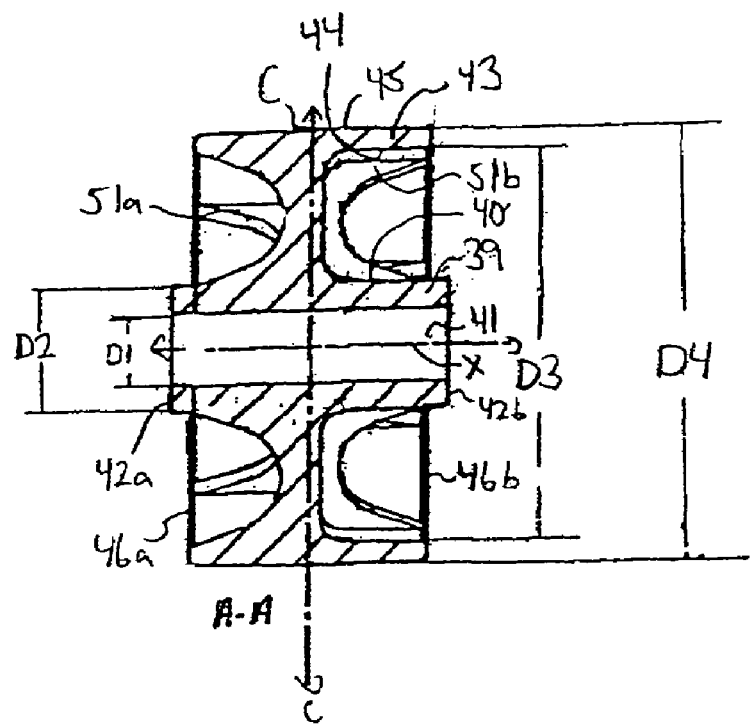
FIG. 15 shows a view of the wheel of FIG. 14 taken along section A-A.
Figure 16:
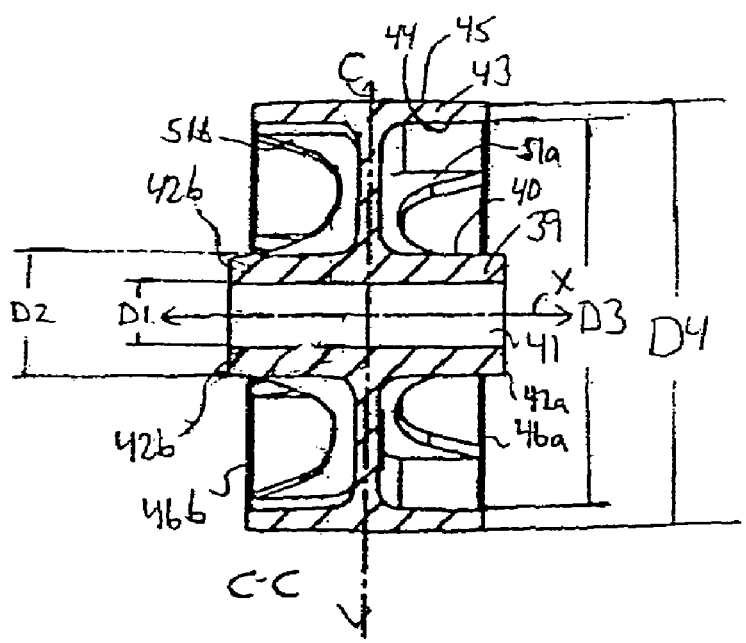
FIG. 16 shows a view of the wheel of FIG. 14 taken along section C-C.

As shown in FIGS. 15 and 16, the hub 39 has an inner diameter D1 and an outer diameter D2, and the rim 43 has an inner diameter D3 and an outer diameter D4. The outer diameter D4 may also be referred to as the "wheel diameter". According to an exemplary embodiment of the invention, the diameters D1, D2, D3 and D4 are approximately 0.317 inches, 0.563 inches, 1.700 inches and 1.900 inches, respectively. Thus, the wheel 37 has a smaller outer diameter (i.e., rim outer diameter D4) than prior art skate wheels.

Referring now to FIGS. 10-11, and 13-16, each side 38a and 38b of wheel 37 can include multiple ribs 51a and 51b, respectively. According to the exemplary embodiment of the wheel 37 shown in FIGS. 10-16, sides 38a and 38b each comprise eight ribs 51a and 51b, respectively. However, each side 38a and 38b may comprise any number of ribs 51a and 51b, respectively, as is required to support loads transported by the track system 1. The load capacity of the exemplary wheel 37 ranges from 225 pounds of dynamic load to 538 pounds of static load. However, increasing the number of ribs 38a and 38b and increasing the hub width W2 and rib width W2 can increase the load capacity of the wheel 37. As shown in FIGS. 10-11, each rib 51a includes a first leg 52a extending on the outer circumferential surface 40 of the hub from the left end 42a of the hub 39 to the hub-web junction 48, a second leg 53a extending on the left web face 50a from the hub-web junction 48 to the rim-web junction 49, and a third leg 54a extending on the inner circumferential surface 44 of the rim 43 from the rim-web junction 49 to the left rim edge 46a. Each rib 51b includes a first leg 52b extending on the outer circumferential surface 40 of the hub from the right hub end 42b to the hub-web junction 48, a second leg 53b extending on the right web face 50b from the hub-web junction 48 to the rim-web junction 49, and a third leg 54b extending on the inner circumferential surface 44 of the rim 43 from the rim-web junction 49 to the right rim edge 46b.

Figure 14:
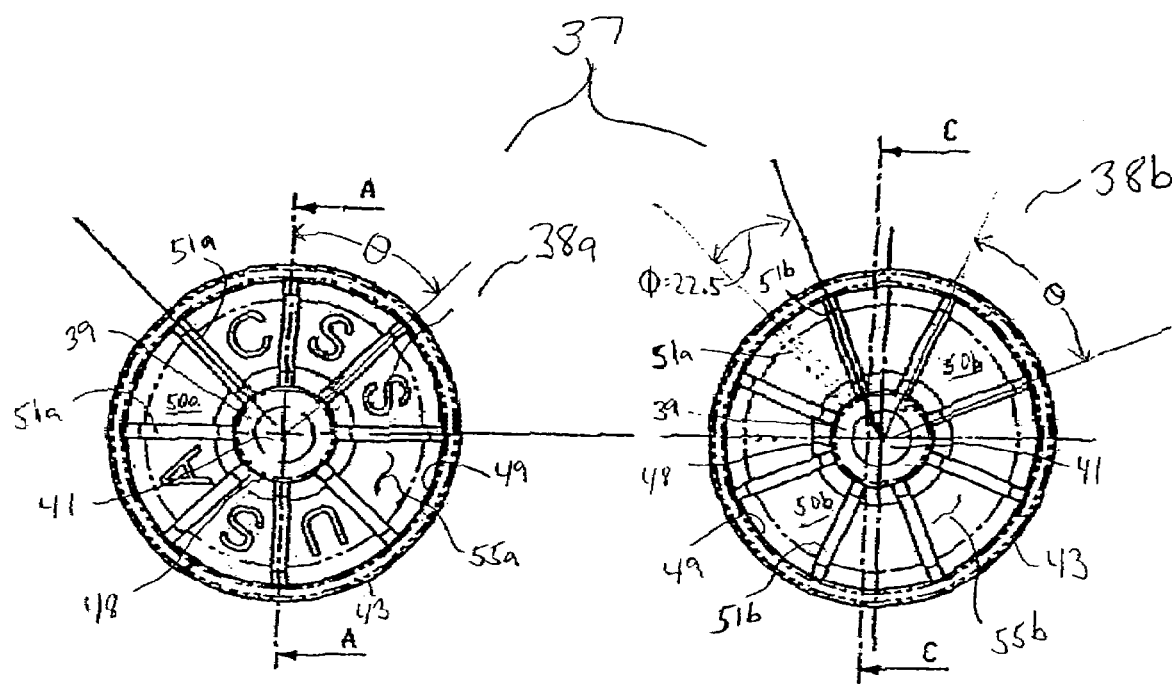
FIG. 14 shows views of two sides of the wheel of FIG. 10.

Referring to FIGS. 14-16, ribs 51a on the left side 38a of the wheel 37 are disposed at selected angular locations about the rotational axis X and are spaced apart by an inter-rib angle $\theta$ (shown in FIG. 14) measured about the rotational axis X. Cavities 55a are defined between consecutive ribs 51a. Optionally, raised identification letters 56 may be formed on web face 50a within a cavities 55a. Although not shown, letters 56 may also be formed on web face 50b. Referring again to FIGS. 14-16, the ribs 51b on the right side 38b of the wheel 37 are disposed at selected angular locations about the rotational axis X, and consecutive ribs 51b are spaced apart by the inter-rib angle $\theta$ (shown in FIG. 14) measured about the rotational axis X. Cavities 55b are defined between consecutive ribs 51b. However, as is shown in FIGS. 13-16, the ribs 51b and cavities 55b are offset from ribs 51a and cavities 55a by an offset angle $\phi$ measured about the rotational axis. In other words, the ribs 51a on the left side 38a do not directly oppose ribs 51b on the right side 38b. According to an exemplary embodiment of the invention in which each wheel side 38a and 38b comprises eight ribs 51a and 51b, the optimum offset angle $\phi$ is approximately 22.5 degrees, as is shown in FIG. 14 and is reflected in FIGS. 15-16. Offsetting the ribs 51a and cavities 55a with respect to the ribs 51b and cavities 55b places a rib 51a on the wheel side 38a at a radial angular location corresponding to the middle of a cavity 55b on wheel side 38b, and places a rib 51b on the wheel side 38b at a radial angular location corresponding to the middle of a cavity 55a on wheel side 38a. This structure approximately doubles the strength of the wheel 37 with respect to the strength of a similar wheel having directly opposed ribs/cavities on opposite sides of the wheel.

The freewheel flow track system 1 is capable of supporting heavy pallets, and allows for efficient and reliable pallet flow. The wheels 37 are constructed of self-lubricating polycarbonate resin and do not include ball bearings, making them resistant to corrosion. Thus, the freewheel flow track system 1 is suitable for heavy-duty pallet flow applications in FDA washdown compliant facilities.

Figure 19:
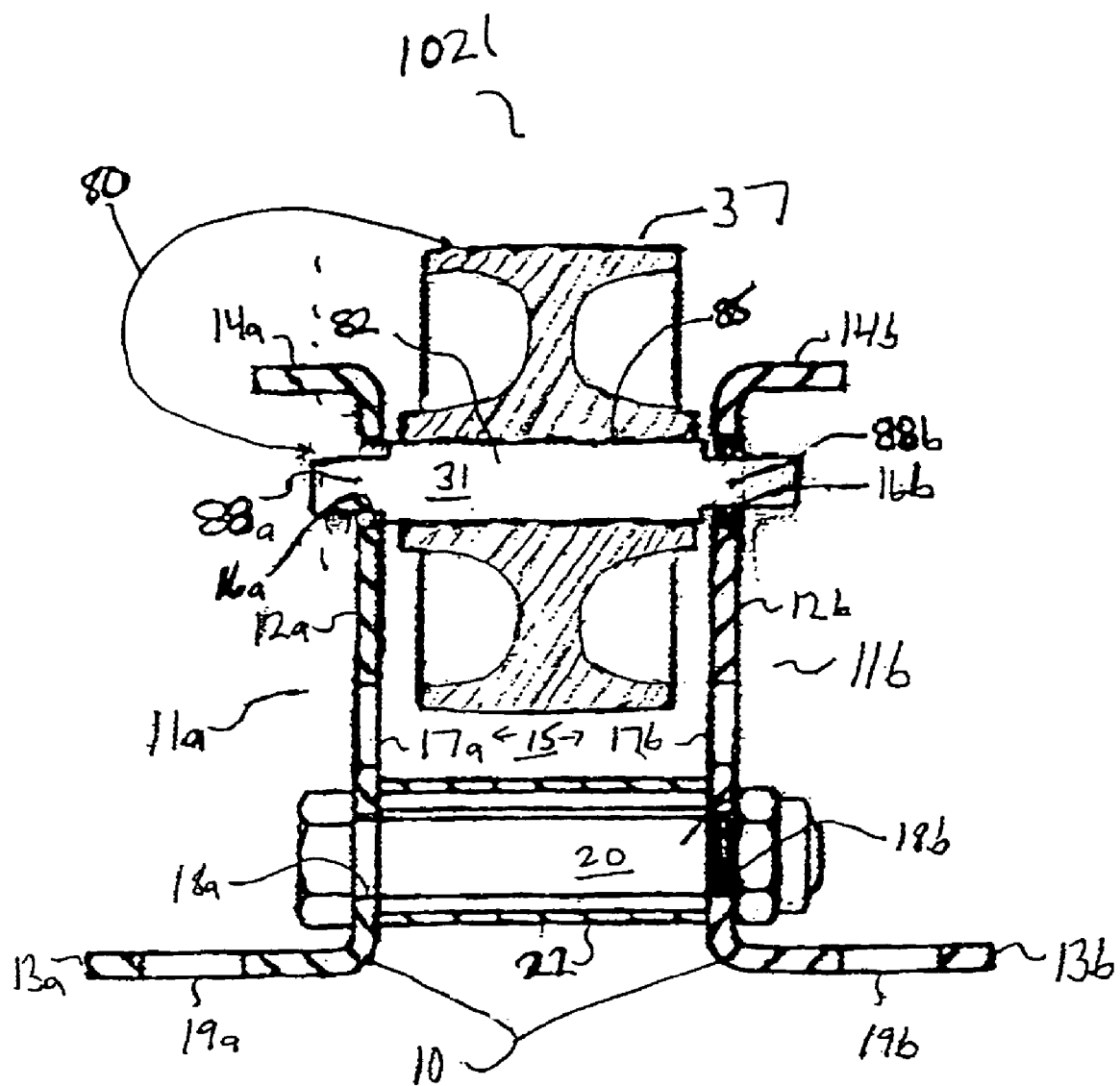
FIG. 19 shows a view of a track sub-assembly of FIG. 18 taken along section D-D.

FIGS. 17-19 show cut-away views of a freewheel flow track system 101 according to another embodiment of the invention. Freewheel flow track system 101 includes a track assembly 102. Referring to FIGS. 17 and 18, the track assembly 102 supports a pallet 5 and includes an entrance end 103 and an exit end 104. Products supported by the track assembly 102 are transported in a track flow direction extending from the entrance end 103 to the exit end 104. As shown in FIG. 17, the track assembly 102 includes track sub-assemblies 102l, 102c and 102r. Track sub-assemblies 102l, 102c and 102r each include a track frame 10 and wheel assemblies 80 mounted to the respective track frame 10. The wheel assemblies 80 of each track sub assembly 102l, 102c and 102r are arranged in a row extending from the entrance end 103 to the exit end 104. Thus, the track sub-assemblies 102l, 102c and 102r are similar to the track sub assemblies 2l, 2c and 2r, except that the track sub-assemblies 102l, 102c and 102r include wheel assemblies 80 instead of the wheel assemblies 30. Since track sub-assemblies 102l, 102c and 102r comprise the same components, only one track sub-assembly 102l will be described in further detail. It should be understood that the following description of track sub-assembly 102l applies to track sub-assemblies 102c and 102r as well.

Track frame 10 of track sub-assembly 102l is described in the first embodiment of the invention and shown in FIGS. 1-9. A wheel assembly 80 is shown in detail in FIG. 19. Each wheel assembly 80 includes an axle 81 and a polycarbonate resin wheel 37 rotatably mounted on the axle 81. A wheel 37 is described in the first embodiment of the invention and is shown in FIGS. 10-16. As shown in FIG. 19, each axle 81 includes a shaft portion 82, a first dimpled end portion 88a at one end of the shaft portion 82 and a second dimpled end portion 88b at an opposite end of the shaft portion. The dimpled end portions 88a and 88b are of a reduced diameter that is smaller than the diameter of the axle mounting holes 16a and 16b and the diameter of shaft portion 82. Axles 81 are preferably constructed from steel, but may be constructed from another suitable metal. with the axles 81 comprise a lubricant coating 85 that is fixed to and bonded with the shaft portion 82. Preferably, the coating 85 is fluorocarbon-based or Teflon-based, and is heated to a high temperature to fix to and bond with the shaft portion 82. The dimpled ends 88a and 88b are mounted within and loosely engage the axle mounting holes 16a and 16b, respectively, within the profiles 11a and 11b of the track frame 10.

The freewheel flow track system 101 provides the features and advantages of the embodiment of FIGS. 1-16. However, in addition to those features and advantages, the axles 81 of freewheel flow track system 101 are able to rotate within the track frame 101 and may be easily inserted in and removed from the track frame 10.

FIGS. 20-28 show cut-away views of a freewheel flow track system 201 according to yet another embodiment of the invention. Freewheel flow track system 201 includes track assembly 202. As shown in FIGS. 20 and 21, the track assembly 202 supports a pallet 5 and includes an entrance end 203 and an exit end 204. Products supported by the track assembly 202 are transported in a track flow direction extending from the entrance end 203 to the exit end 204. Referring to FIG. 20, the track assembly 202 comprises track sub-assemblies 202l, 202c and 202r. Track sub-assemblies 202l, 202c and 202r each include a track frame 60 and wheel assemblies 30 mounted to the respective track frame 60. The wheel assemblies 30 of each sub assembly 202l, 202c and 202r are arranged in a longitudinal row extending from the entrance end 203 to the exit end 204. Thus, the track sub-assemblies 202l, 202c and 202r are similar to the track sub-assemblies 2l, 2c and 2r, except that the track sub-assemblies 202l, 202c and 202r include track frames 60 instead of track frames 10. Track sub-assemblies 202l, 202c and 202r comprise the same components. Therefore, only one track sub-assembly 202l will be described in further detail. It should be understood that the following description of track sub-assembly 202l also applies to track subassemblies 202c and 202r.

Figure 22:
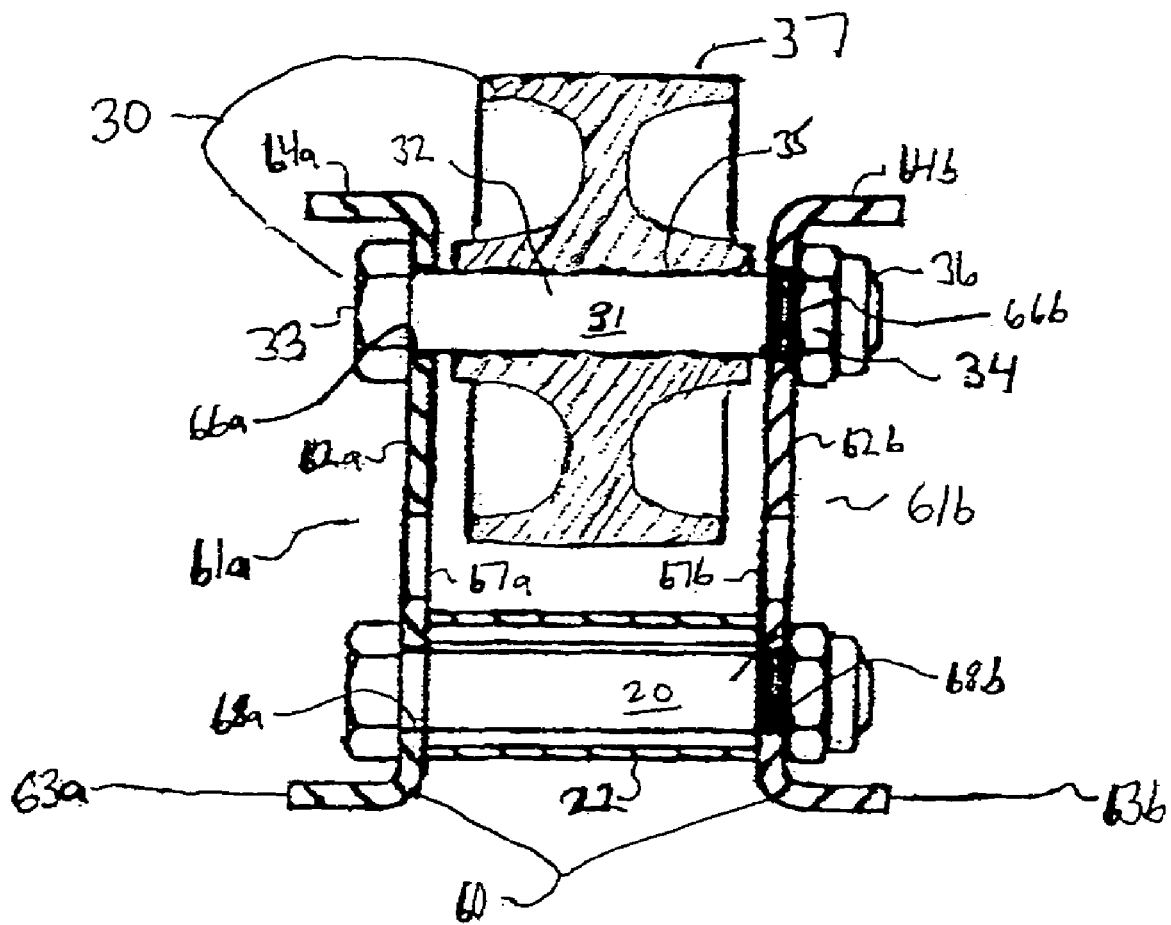
FIG. 22 shows a view of a track sub-assembly of FIG. 21 taken along section B-B.
Figure 23:
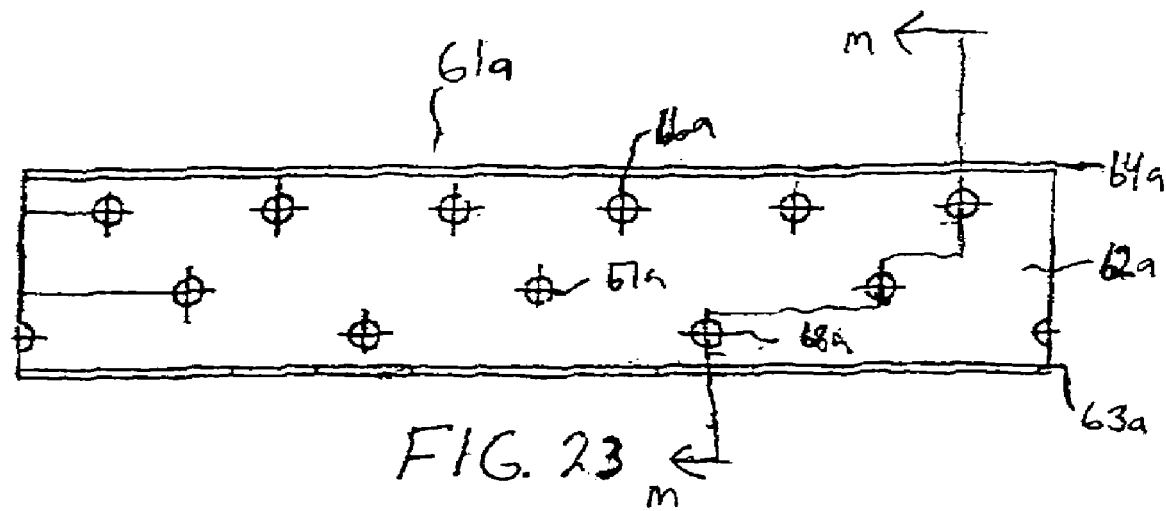
FIG. 23 shows a partial side view of a first profile of the freewheel flow track system of FIG. 20.
Figure 24:
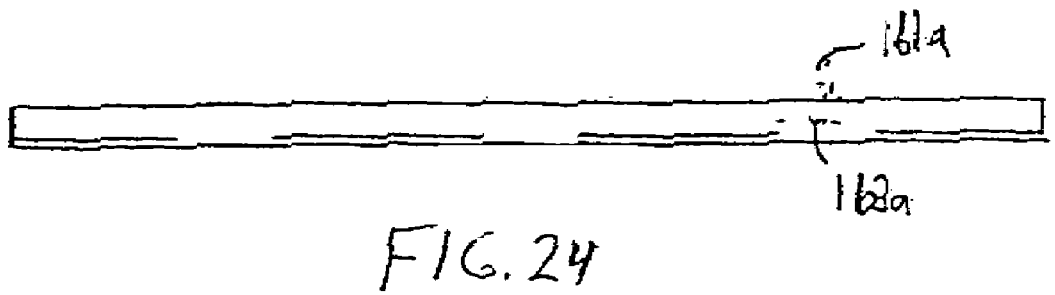
FIG. 24 shows a partial bottom view the profile of FIG. 23.
Figure 25:
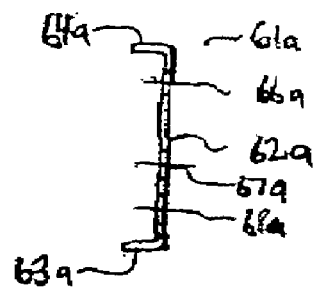
FIG. 25 shows a view of the profile of FIG. 23, taken along section M-M.

The track frame 60 of the track sub-assembly 202l comprises profiles 61a and 61b. The profiles 61a and 61b are fastened together in spaced relationship, forming a channel 15 between them. As shown in FIGS. 22-28, profiles 61a and 61b are identical in construction. However, profiles 61a and 61b are installed in track frame 60l in opposite orientations, as can be seen in FIG. 22. Profiles 61a and 61b preferably comprise C-channel members constructed from galvanized steel, but may be constructed from other suitable parts and/or materials. As shown in FIGS. 22-25, the profile 61a includes a vertical section 62a, a bottom leg 63a connected to a bottom part of vertical section 62a and an upper leg 64a connected to a top part of vertical section 62a. Similarly, as shown in FIGS. 22 and 26-28, the profile 61b includes a vertical section 62b, a bottom leg 63b connected to a bottom part of vertical section 62b and an upper leg 64b connected to a top portion of vertical section 62b.

The lower legs 63a and 63b and upper legs 64a and 64b extend away from the channel 15 in a direction substantially perpendicular to the length of the profiles 61a and 61b, and may be mounted to an underlying support structure (not shown) using known mounting elements and methods. The top legs 64a and 64b extend away from the channel 15 to cover mounting hardware for the wheel assemblies 30, which are described in following paragraphs. As shown in FIGS. 21-23, 25, 26 and 28, each channel section 62a and 62b further includes a respective longitudinal row of upper profile mounting holes 67a and 67b and a respective longitudinal row of lower profile mounting holes 68a and 68b. The lower profile mounting holes 68a and 68b are disposed below and longitudinally offset from the respective upper profile mounting holes 67a and 67b, such that upper profile mounting holes 67a and 67b and lower profile mounting holes 68a and 68b are disposed along the length of the respective profiles 61a and 61b in alternating fashion. Referring to FIG. 22, the profile mounting holes 67a and 68a of the profile 61a are aligned with profile mounting holes 67b and 68b, respectively, of the profile 61b. As illustrated in FIGS. 21 and 22, threaded rods 20 are fastened between selected corresponding pairs of lower profile mounting holes 68a and 68b. As shown in FIG. 22, spacers 22 are mounted on threaded rods 20 to stabilize the profiles 61a and 61b and to maintain proper spacing between the profiles 61a and 61b. Preferably, threaded rods 20 are fastened between corresponding pairs of upper profile mounting holes 17a and 17b and corresponding pairs of lower profile mounting holes 18a and 18b in alternating fashion as indicated in FIG. 21.

Figure 26:
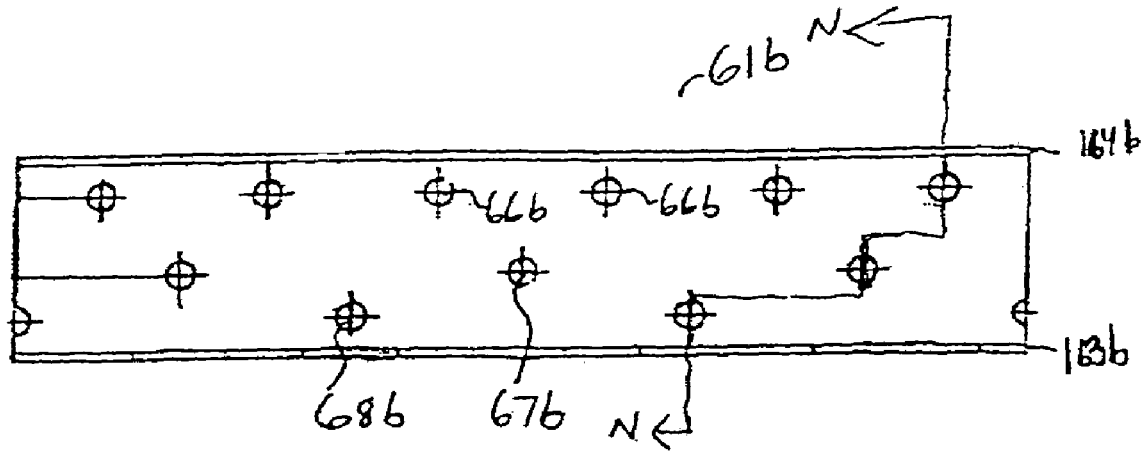
FIG. 26 shows a partial side view of a second profile of the freewheel flow track system of FIG. 20.
Figure 27:
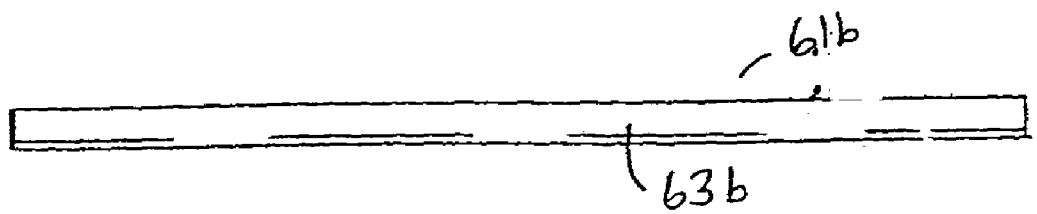
FIG. 27 shows a partial bottom view the profile of FIG. 26.
Figure 28:
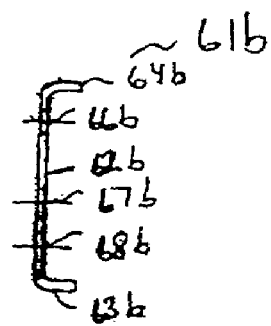
FIG. 28 shows a view of the profile of FIG. 26, taken along section N-N.

The channel sections 62a and 62b further include respective axle mounting holes 66a (shown in FIGS. 21-23 and 25) and 66b (shown in FIGS. 22, 26 and 28). The axle mounting holes 66a and 66b are disposed in a longitudinal row along the respective channel sections 62a and 62b, respectively. The axle mounting holes 66a of profile 61a are aligned with the axle mounting holes 66b of profile 61b for receiving the axles 31 of wheel assemblies 30.

Each axle 31 extends between profiles 61a and 61b transverse to the track flow direction. The head portion 33 and threaded end portion 34 of each axle 31 are mounted within an axle mounting holes 66a and 66b, respectively. A nut 36 engages the threaded end portion 34 of each axle 31 and works in conjunction with the head portion 33 to secure the axle 31 between axle holes 66a and 66b.

Thus, freewheel flow track system 201 is similar to freewheel flow track system 1, except that freewheel flow track system 201 includes profiles 61a and 61b in the place of profiles 11a and 11b. Profiles 61a and 61b comprise C-channels having narrower bottom legs 63a and 63b than the bottom legs 13a and 13b of profiles 11a and 11b. Profiles 61a and 61b also lack the bottom leg mounting holes 19a and 19b of profiles 11a and 11b. Therefore, the profiles 61a and 61b are simpler and more cost-effective to manufacture than profiles 11a and 11b are. However, profiles 11a and 11b can support heavier loads than profiles 61a and 61b can.

Figure 31:
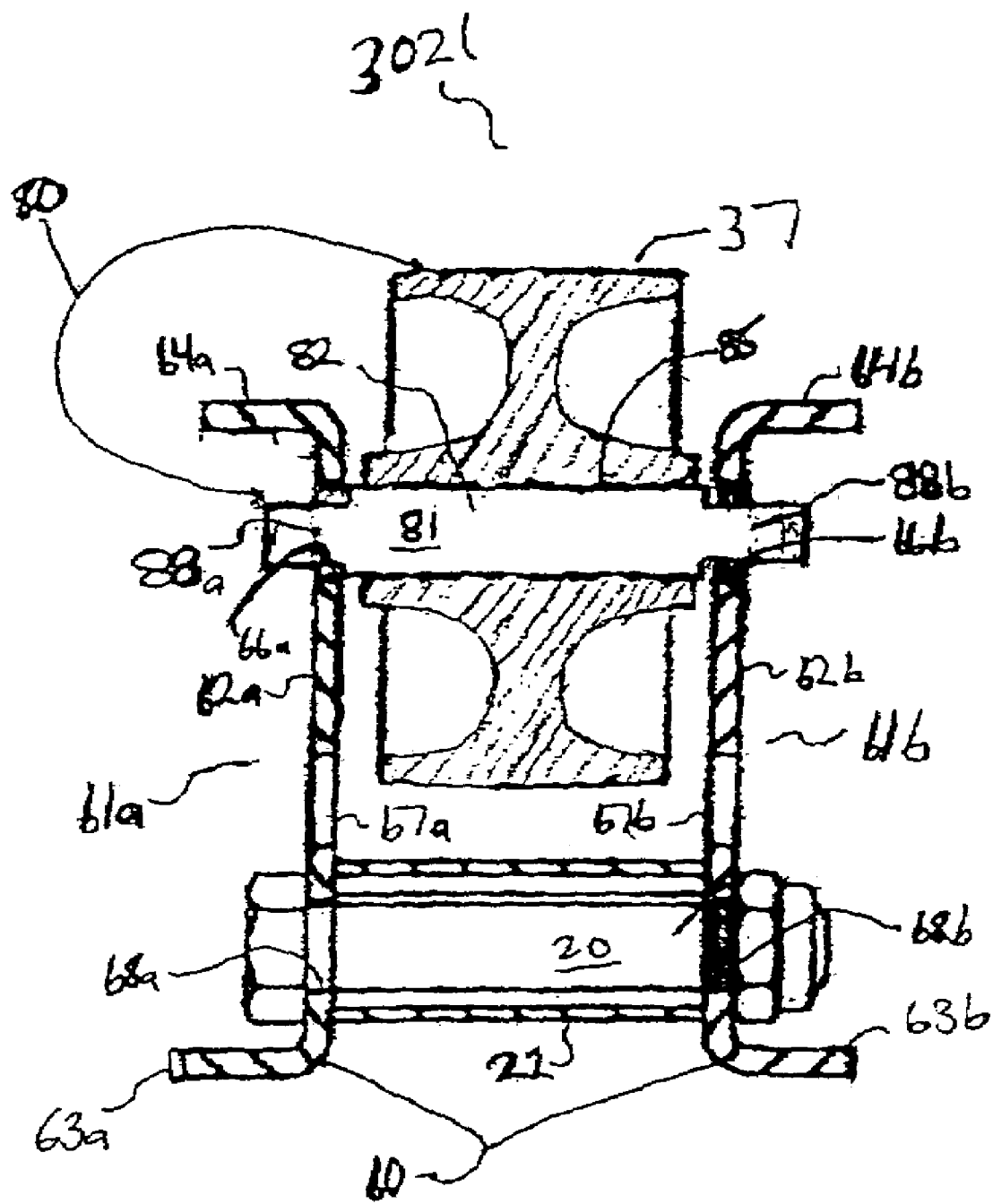
FIG. 31 shows a view of a track sub-assembly of FIG. 30 taken along section F-F.

FIGS. 29-31 show a freewheel track system 301 according to another embodiment of the invention. The freewheel track system 301 includes a track assembly 302. The track assembly 302 includes an entrance end 303 and an exit end 304, and comprises track sub-assemblies 302l, 302c and 302r. Products supported by the track assembly 302 are transported in a track flow direction extending from the entrance end 303 to the exit end 304. Each track sib-assembly includes a track frame 60 and multiple wheel assemblies 80 mounted to the respective track frame. The wheel assemblies 80 of each sub-assembly 302l, 302c and 302r are arranged in a row extending from the entrance end 303 to the exit end 304. Since track sub-assemblies 302l, 302c and 302r identical in construction, only one track sub-assembly 302l will be further described. It should be understood that track sub-assemblies 302c and 302r include the same elements disclosed in the description of track sub-assembly 302l.

The track frame 60 is described in full with respect to the embodiment of FIGS. 20-28. A wheel assembly 80 is fully described in the embodiment shown in FIGS. 17-19. As shown in FIG. 31, the track sub-assembly 302l is assembled by mounting the axles 81 of the wheel assemblies 80 between the profiles 61a and 61b of track frame 60. More particularly, the dimpled ends 88a and 88b of axles 81 are mounted within and engage axle mounting holes 66a and 66b, respectively. The profiles 61a and 61b of this embodiment of the invention are cost-effective to manufacture. Furthermore, the axles 81 rotate within the track frame 60 and can easily be installed in and removed from the track frame 60.

Figure 32:
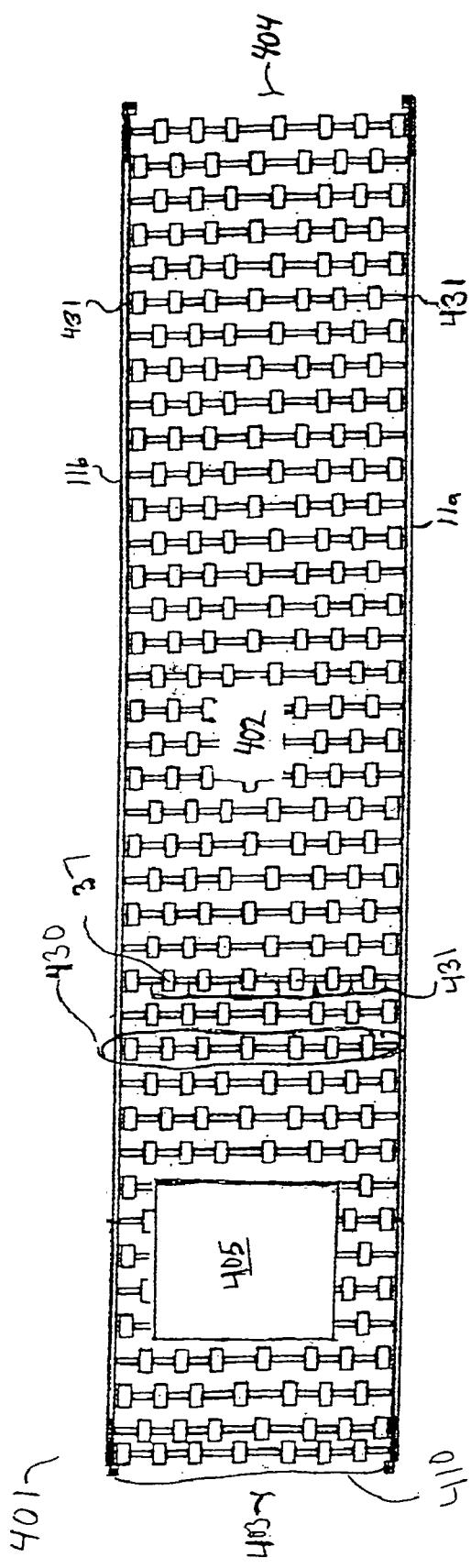
FIG. 32 shows a cut-away top view of a freewheel track system according to yet another embodiment of the invention.
Figure 33:
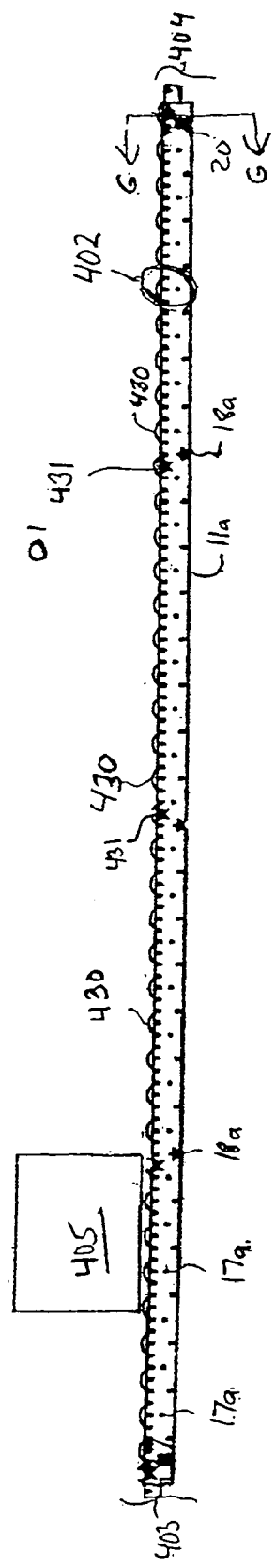
FIG. 33 shows a cut-away side view of the freewheel track system of FIG. 32.
Figure 34:
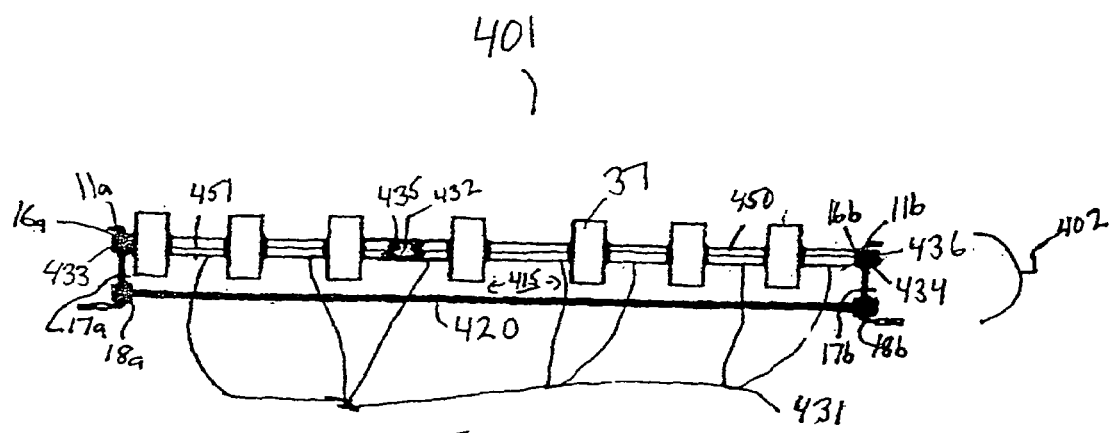
FIG. 34 shows a view of a track assembly of the freewheel system of FIG. 33 taken along section G-G.

FIGS. 32-34 show a freewheel flow track system 401 according to yet another embodiment of the invention. Freewheel flow track system 401 is particularly well-suited for directly supporting cartons. FIG. 32 shows a cut-away view of the freewheel flow track system 401 including a wide track assembly 402 having an entrance end 403 and an exit end 404. Products supported by the track assembly 402 are transported in a track flow direction extending from the entrance end 403 to the exit end 404. The track assembly 402 is supported by an underlying support structure (not shown), typically (though not necessarily) in an inclined orientation. The track assembly 402 comprises a longitudinally extending track frame 410 extending from the entrance end 403 to the exit end 404, and wheel assemblies 430 mounted b the track frame 410 for maintaining rolling engagement with a carton 405. The wheel assemblies 430 are arranged in a row extending from the entrance end 403 to the exit end 404.

Referring to FIGS. 32 and 33, a carton 405 is shown supported by the track assembly 402. The carton 405 comprises a box that is representative of cartons commonly used in picking applications. A bottom panel (not shown) of the carton 405 contacts the wheel assemblies 430.

As shown in FIGS. 32 and 34, the track frame 410 includes a first, or left profile 11a and a second, or right profile 11b, which are fastened together in a spaced relationship by long threaded fastening rods 420. The profiles 11a and 11b are supported by the support structure. The profiles 11a and 11b are fastened together in spaced relationship, forming a relatively wide channel 415 between them. That is, the width of the channel 415 is greater than the width of the carton 405. Profiles 11a and 11b are fully described in previous embodiments of the invention with reference to FIGS. 19-25. As in previous embodiments of the invention, profiles 11a and 11b are installed in opposite orientations, as can be seen in FIG. 34.

As illustrated in FIG. 34, the upper profile mounting holes 17a and lower profile mounting holes 18a of profile 11a are aligned with the upper profile mounting holes 17b and lower profile mounting holes 18b of profile 11b. As shown in FIGS. 33 and 34, the threaded rods 420 are fastened between selected corresponding pairs of lower profile mounting holes 18a and 18b. However, in alternative embodiments of the invention, threaded rods 420 may be fastened between selected pairs of upper profile mounting holes 17a and 17b and/or lower profile mounting holes 18a and 18b as is necessary to secure the profiles 11a and 11b to each other. The axle mounting holes 16a of profile 11a are aligned with the axle mounting holes 16b of profile 11b for receiving axles of wheel assemblies 430. A description of wheel assemblies 430 follows.

A wheel assembly 430 is shown in detail in FIG. 34. As shown in FIG. 34, each wheel assembly 430 includes a multi-wheel axle 431 and multiple polycarbonate resin wheels 37 rotatably mounted on the axle 431. The wheels 37 of a given wheel assembly 430 are mounted along the axle 431 in a row extending transverse to the track flow direction. A wheel 37 is shown in FIGS. 10-16 and is fully described in the first embodiment of the invention with reference to FIGS. 10-16. As shown in FIG. 34, each axle 431 includes a shaft potion 432, a head portion 433 adjacent one end of the shaft portion and a threaded end portion 434 adjacent a second end of the shaft portion. Axles 431 are preferably constructed from steel, but may be constructed from another suitable metal. The shaft portions 432 are coated with a lubricant coating 435 that is fixed to and bonded with the shaft portion 432. Preferably, the coating 435 is fluorocarbon-based or Teflon-based, and is heated to a high temperature to fix to and bond with the shaft portion 432. Each axle 431 extends between profiles 11a and 11b transverse to the track flow direction. The head portion 433 and threaded end portion 434 of each axle 431 are mounted within axle mounting holes 16a and 16b, respectively. A nut 436 engages the threaded end portion 434 of each axle 431 and works in conjunction with the head portion 433 to secure the axle 431 between axle holes 116a and 116b.

The wheel assembly 430 further includes a plurality of axle spacers 450. Axle spacers 450 are mounted on the axle 431 between consecutive wheels 37 in the assembly 430 and secure the wheels 37 in a desired position along the axle 431. Various numbers of spacers 450 and spacers 450 of varying sizes may be used in each wheel assembly, and the arrangement of the spacers 450 and wheels 37 in a wheel assembly 430 may be varied to change the position of the wheels 37 along the axle 431. The spacers 450 include spacer slits 451 to allow the spacers 450 to be snapped onto and off of the axle 431, thereby facilitating the task of changing the positions of the wheels 37 along the axle 431. As shown in FIG. 32, wheels 37 within a given wheel assembly 430 occupy unique transverse positions with respect to the wheels 37 of adjacent wheel assemblies 430, wherein the transverse positions are measured in the direction transverse to the track flow direction. Positioning the wheels 37 in this manner generally enables more wheels to contact the bottom of a carton 405.

The wide track assembly 402 provides high load capacity for supporting heavy cartons and provides reliable and efficient carton flow through the use of the wheel assemblies 430, which each comprise a row of multiple polycarbonate wheels 37 extending transverse to the track flow direction.

Figure 37:
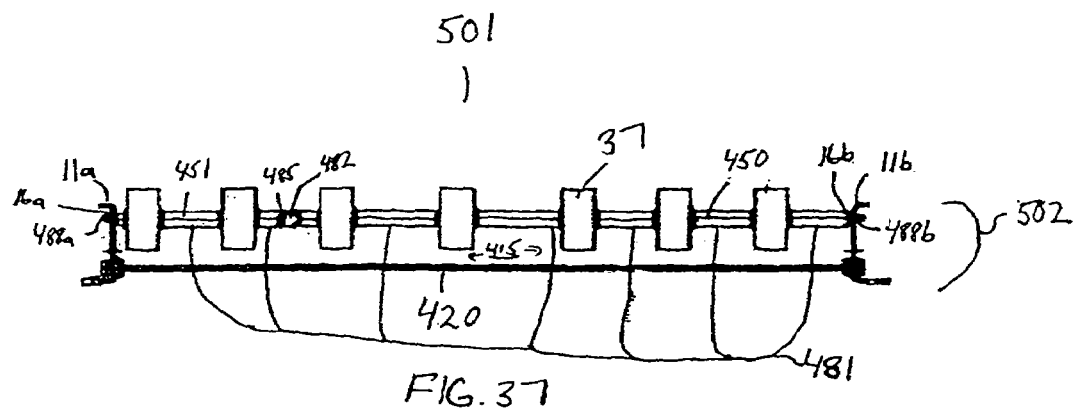
FIG. 37 shows a view of a track assembly of the freewheel system of FIG. 36 taken along section H-H.
Figure 35:
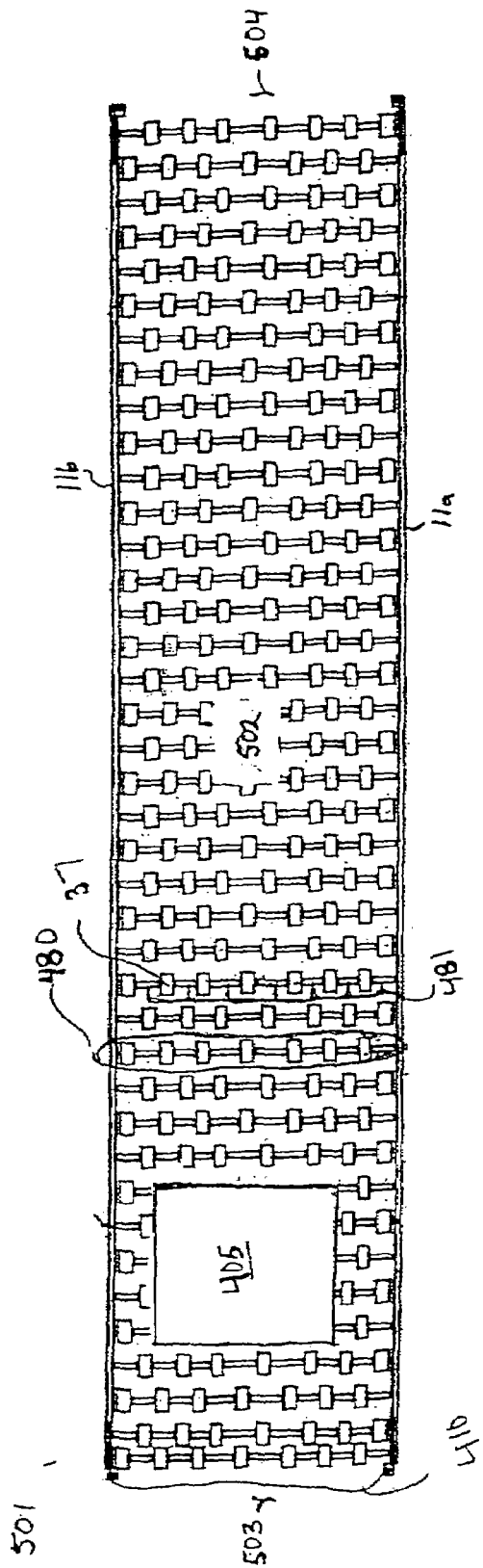
FIG. 35 shows a cut-away top view of a freewheel track system according to another embodiment of the invention.
Figure 36:
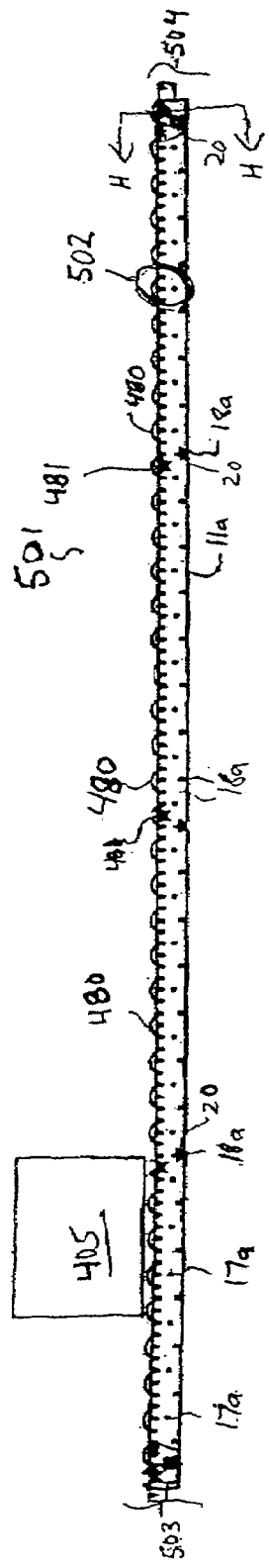
FIG. 36 shows a cut-away side view of the freewheel track system of FIG. 35.

Yet another embodiment of the invention is shown in FIGS. 35-37. As shown in FIGS. 35 and 36, freewheel flow track system 501 comprises track assembly 502 having an entrance end 503 and an exit end 504. Products supported by the track assembly 502 are transported in a track flow direction extending from the entrance end 503 to the exit end 504. The flow track system 502 is shown supporting a carton 405. Track assembly 502 includes track frame 410 and wheel assemblies 480 mounted to the track frame 410. The wheel assemblies 480 are arranged in a row extending from the entrance end 503 to the exit end 504. The track frame 410 is fully described in the embodiment of FIGS. 32-34.

As shown in FIG. 37, wheel assemblies 480 are similar to wheel assemblies 430, with the exception of multi-wheel axles 481. The axles 481 each include a shaft portion 482, a first dimpled end portion 488a adjacent one end of the shaft portion 482 and a second dimpled end portion 488b adjacent a second end of the shaft portion 482. Axles 481 are preferably constructed from steel, but may be constructed from another suitable metal. The shaft portions 482 are coated with a lubricant coating 485 that is fixed to and bonded with the shaft portion 482. Preferably, the coating 485 is fluorocarbon-based or Teflon-based, and is heated to a high temperature to fix to and bond with the shaft portion 482. Axles 481 extend between profiles 11a and 11b transverse to the track flow direction. As shown in FIG. 35, wheels 37 within a given wheel assembly 480 occupy unique transverse positions with respect to the wheels 37 of adjacent wheel assemblies 480, wherein the transverse positions are measured in the direction transverse to the track flow direction. The dimpled end portions 488a and 488b are mounted within and engage axle mounting holes 16a and 16b, respectively, of profiles 11a and 11b. Thus, the axles 481 are able to rotate within the track frame 410 and may be easily inserted in and removed from the frame 410.

FIGS. 38-40 show a freewheel flow track system 601 according to another embodiment of the invention. As shown in FIGS. 38 and 39, freewheel flow track system 601 comprises a track assembly 602 having an entrance end 603 and an exit end 604. Products supported by the track assembly 602 are transported in a track flow direction extending from the entrance end 603 to the exit end 604. The track assembly 602 is shown supporting a carton 405. Track assembly 402 includes a track frame 460 and wheel assemblies 430 mounted to the frame 460. The wheel assemblies 430 are arranged in a row extending from the entrance end 603 to the exit end 404. Track frame 460 includes profiles 61a and 61b, which are shown in greater detail in FIGS. 23 to 28 and are fully described in previous embodiments of the invention. The profiles 61a and 61b are fastened together in spaced relationship, forming a channel 415 between them. More particularly, referring to FIG. 40, the profile mounting holes 67a and 68a of the profile 61a are aligned with corresponding profile mounting holes 67b and 68b, respectively, of the profile 61b. As illustrated in FIGS. 39 and 40, threaded rods 420 are fastened between selected corresponding pairs of lower profile mounting holes 68a and 68b, but may be fastened between any selected pairs of upper profile mounting holes 67a and 67b and/or pairs of lower profile mounting holes 68a and 68b. Axles 431 extend between profiles 61a and 61b transverse to the track flow direction, and are mounted within axle mounting holes 66a and 66b. As shown in FIG. 38, wheels 37 within a given wheel assembly 430 occupy unique transverse positions with respect to the wheels 37 of adjacent wheel assemblies 430, wherein the transverse positions are measured in the direction transverse to the track flow direction. Due to the use of profiles 61a and 61b in place of profiles 11a and 11b, the freewheel system 601 is more cost-effective to manufacture than systems 401 and 501, however it is not as well-suited for supporting heavy cartons.

Yet another embodiment of the invention is shown in FIGS. 41-43. FIG. 37 shows a freewheel flow track system 701 including track assembly 702 having an entrance end 703 and an exit end 704. Products supported by the track assembly 702 are transported in a track flow direction extending from the entrance end 703 to the exit end 704. The track assembly 702 is shown supporting a carton 405. As illustrated in FIGS. 41-43, the track assembly 702 includes a track frame 460 and wheel assemblies 480 mounted to the track frame 460. The wheel assemblies 480 are arranged in a row extending from the entrance end 703 to the exit end 704. As described with respect to the embodiment of FIGS. 38-40, the track frame 460 includes profiles 61a and 61b. As described in the embodiment of FIGS. 35-37, the wheel assemblies 480 include axles 481, wheels 37 and spacers 450 mounted on axles 481. This embodiment of the invention is achieved by mounting the wheel assemblies 480 to profiles 61a and 61b. More specifically, as shown info FIG. 43, axles 481 extend between profiles 61a and 61b transverse to the track flow direction, and dimpled end portions 88a and 88b are mounted within axle mounting holes 66a and 66b, respectively. As shown in FIG. 41, wheels 37 within a given wheel assembly 480 occupy unique positions with respect to the wheels 37 of adjacent wheel assemblies 480, wherein the transverse positions are measured in the direction transverse to the track flow direction. This embodiment of the invention combines cost-effective profiles 61a and 61b with axles 481 that are easily insertable in and removable from track frame 460.

It will be understood by those skilled in the art that while the foregoing invention has a been disclosed with reference to preferred embodiments or features, various modifications, changes and additions can be made to the foregoing invention without departing from the spirit and scope of the invention as set forth in the following claims.

I claim:

1. A flow track system for supporting and transporting items, comprising:
   a track assembly comprising at least one track sub-assembly, the track sub-assembly comprising a track frame; and
   a plurality of wheel assemblies, each wheel assembly comprising at least one wheel rotatably mounted on an axle, the wheel comprising:
      a substantially cylindrical hub,
      a rim concentric with the hub,
      a web connecting the hub to the rim, and
      a plurality of ribs connecting the hub to the rim through the web, each rib comprising a first leg extending from the hub to the hub-web junction, a second leg extending from the hub-web junction to the rim-web junction, and a third leg extending from the rim-web junction to the rim.

2. The flow track system of claim 1, wherein the hub is slightly wider than the rim in a direction substantially parallel to a rotational axis of the wheel.

3. The flow track system of claim 1, wherein the wheel is constructed of a polycarbonate-based resin impregnated with a lubricant.

4. The flow track system of claim 1, wherein the wheel is constructed of a polycarbonate-based resin impregnated with a lubricant, the lubricant comprising at least one of the following materials: silicone and molybdenum.

5. The flow track system of claim 1, wherein the wheel is constructed of PC/PET 325.

6. The flow track system of claim 1, wherein the axle comprises a shaft portion, a lubricant coating being fixed to and bonded with the shaft portion.

7. The flow track system of claim 1, wherein the axle comprises a shaft portion, a lubricant coating being fixed to and bonded with the shaft portion, the lubricant coating comprising at least one of the following materials: a fluorocarbon-based lubricant or a Teflon-based lubricant.

8. The flow track system of claim 1, wherein the track assembly comprises three parallel track sub-assemblies.

9. The flow track system of claim 1, wherein:
   the axle comprises:
      a shaft portion, a lubricant coating being fixed to and bonded with the shaft portion;
      a head portion adjacent to a first end of the shaft portion;
      a threaded end portion adjacent to a second end of the shaft portion; and
   the track frame comprises a pair of parallel profiles, the head portion of the axle and the threaded end portion of the axle being mounted within axle mounting holes in the profiles.

10. The flow track system of claim 1, wherein:
   the axle comprises:
      a shaft portion, a lubricant coating being fixed to and bonded with the shaft portion;
      a first dimpled end portion adjacent to a first end of the shaft portion;
      a second dimpled end portion adjacent to a second end of the shaft portion; and
   the track frame comprises a pair of parallel profiles, the first dimpled end portion of the axle and the second dimpled end portion of the axle being mounted within axle mounting holes in the profiles.

11. The flow track system of claim 1, wherein:
   the track assembly extends longitudinally from an entrance end to an exit end; and
   the wheel assemblies are mounted to the track frame arranged in rows extending from the entrance end to the exit end, the wheels of a first wheel assembly occupying unique transverse positions with respect to the wheels of a second wheel assembly, the second wheel assembly being adjacent to the first wheel assembly.

12. The flow track assembly of claim 1, wherein ribs disposed on a first side of the wheel are offset from ribs disposed on a second side of the wheel by an offset angle.

13. The flow track assembly of claim 12, wherein consecutive ribs are spaced apart by an inter-rib angle such that cavities are defined between consecutive ribs.

14. The flow track assembly of claim 13, wherein the offset angle is approximately half the inter-rib angle.

15. The flow track assembly of claim 14, wherein the inter-rib angle is 45 degrees.

16. A flow track system, for supporting and transporting items, comprising:
   a track assembly comprising at least one track sub-assembly, the track sub-assembly comprising a track frame; and
   a plurality of wheel assemblies, each wheel assembly comprising at least one wheel rotatably mounted on an axle, the wheel comprising:
      a substantially cylindrical hub, a rim concentric with the hub, a web connecting the hub to the rim, and a plurality of ribs connecting the hub to the rim through the web, wherein consecutive ribs are spaced apart by an inter-rib angle such that cavities are defined between consecutive ribs, and wherein the ribs and cavities disposed on a first side of the wheel are offset from the ribs and cavities disposed on a second side of the wheel by an offset angle that is approximately half the inter-rib angle.

17. The flow track system of claim 16, wherein the hub is slightly wider than the rim in a direction substantially parallel to a rotational axis of the wheel.

18. The flow track system of claim 16, wherein the wheel is constructed of a polycarbonate-based resin impregnated with a lubricant.

19. The flow track system of claim 16, wherein the wheel is constructed of a polycarbonate-based resin impregnated with a lubricant, the lubricant comprising at least one of the following materials: silicone and molybdenum.

20. The flow track system of claim 16, wherein the wheel is constructed of PC/PET 325.

21. The flow track system of claim 16, wherein the axle comprises a shaft portion, a lubricant coating being fixed to and bonded with the shaft portion.

22. The flow track system of claim 16, wherein the axle comprises a shaft portion, a lubricant coating being fixed to and bonded with the shaft portion, the lubricant coating comprising at least one of the following materials: a fluorocarbon-based lubricant or a Teflon-based lubricant.

23. The flow track system of claim 16, wherein the track assembly comprises three parallel track sub-assemblies.

24. The flow track system of claim 16, wherein:
the axle comprises:
a shaft portion, a lubricant coating being fixed to and bonded with the shaft portion;
a head portion adjacent to a first end of the shaft portion;
a threaded end portion adjacent to a second end of the shaft portion; and
the track frame comprises a pair of parallel profiles, the head portion of the axle and the threaded end portion of the axle being mounted within axle mounting holes in the profiles.

25. The flow track system of claim 16, wherein:
the axle comprises:
a shaft portion, a lubricant coating being fixed to and bonded with the shaft portion;
a first dimpled end portion adjacent to a first end of the shaft portion;
a second dimpled end portion adjacent to a second end of the shaft portion; and
the track frame comprises a pair of parallel profiles, the first dimpled end portion of the axle and the second dimpled end portion of the axle being mounted within axle mounting holes in the profiles.

26. The flow track system of claim 16, wherein:
the track assembly extends longitudinally from an entrance end to an exit end; and
the wheel assemblies are mounted to the track frame arranged in rows extending from the entrance end to the exit end, the wheels of a first wheel assembly occupying unique transverse positions with respect to the wheels of a second wheel assembly, the second wheel assembly being adjacent to the first wheel assembly.

27. The flow track assembly of claim 16, wherein the inter-rib angle is about 45 degrees.

28. The flow track assembly of claim 16, wherein the offset angle is about 22.5 degrees.

29. The flow track assembly of claim 16, wherein each rib comprises:
a first leg extending from the hub to the hub-web junction;
a second leg extending from the hub-web junction to the rim-web junction; and
a third leg extending from the rim-web junction to the rim.

30. A flow track system for supporting or transporting items comprising at least one flow track assembly comprising:
a track frame; and
multiple wheels, each comprising a hub, a rim, a web, a first set of ribs disposed on a first wheel side, and a second set of ribs disposed on a second wheel side, wherein the second set of ribs are offset from the first set of ribs by an offset angle.

31. The flow track assembly of claim 30, wherein the ribs extend from the hub to the rim.

32. The flow track assembly of claim 30, wherein the ribs are spaced apart by an inter-rib angle such that cavities are defined between consecutive ribs.

33. The flow track assembly of claim 32, wherein the offset angle is approximately half the inter-rib angle.

34. The flow track assembly of claim 32, wherein the inter-rib angle is about 45 degrees.

35. The flow track assembly of claim 30, wherein the track frame comprises a pair of parallel profiles with a vertical section, a top leg extending from a top of said vertical section, and a bottom leg extending from a bottom of said vertical section and including a bottom leg mounting hole for securing the profile to a support structure.

36. The flow track system of claim 30, comprising at least two flow track assemblies.

37. The flow track assembly of claim 30, wherein the offset angle is about 22.5 degrees.

38. The flow track system of claim 30, wherein at least one wheel is constructed of a polycarbonate-based resin impregnated with a lubricant.

39. The flow track system of claim 30, wherein at least one wheel is constructed of a polycarbonate-based resin impregnated with a lubricant, the lubricant comprising at least one of the following materials: silicone and molybdenum.

40. The flow track system of claim 30, wherein at least one wheel is constructed of PC/PET 325.

41. The flow track system of claim 30, wherein at least one wheel is mounted on an axle, the axle comprising a shaft portion, a lubricant coating being fixed to and bonded with the shaft portion.

42. The flow track system of claim 41, wherein the lubricant coating comprises at least one of the following materials: a fluorocarbon-based lubricant or a Teflon-based lubricant.

43. The flow track system of claim 30, wherein the track assembly comprises three parallel track sub-assemblies.

44. The flow track system of claim 30, wherein each rib comprises:
a first leg extending from the hub to the hub-web junction;
a second leg extending from the hub-web junction to the rim-web junction; and
and a third leg extending from the rim-web junction to the rim.

* * * * *